United States Patent
Teo

(10) Patent No.: US 8,031,223 B2
(45) Date of Patent: *Oct. 4, 2011

(54) VIRTUAL REALITY CAMERA

(75) Inventor: Patrick Teo, San Jose, CA (US)

(73) Assignee: Intellectual Ventures I LLC, Wilmington, DE (US)

( * ) Notice: Subject to any disclaimer, the term of this patent is extended or adjusted under 35 U.S.C. 154(b) by 1434 days.

This patent is subject to a terminal disclaimer.

(21) Appl. No.: 11/515,498

(22) Filed: Aug. 31, 2006

(65) Prior Publication Data

US 2007/0109398 A1    May 17, 2007

Related U.S. Application Data

(63) Continuation of application No. 09/378,398, filed on Aug. 20, 1999, now Pat. No. 7,292,261.

(51) Int. Cl.
H04N 7/00 (2011.01)
G02B 13/06 (2006.01)
G03B 35/00 (2006.01)

(52) U.S. Cl. ............... 348/36; 359/725; 396/324

(58) Field of Classification Search ............ 348/36, 348/42, 333.12; 396/324, 130, 322; 345/660; 358/71; 359/725
See application file for complete search history.

(56) References Cited

U.S. PATENT DOCUMENTS

| | | | |
|---|---|---|---|
| 4,763,280 A | 8/1988 | Robinson et al. |
| 4,811,245 A | 3/1989 | Bunker et al. |
| 4,841,292 A | 6/1989 | Zeno |
| 5,022,085 A | 6/1991 | Cok |
| 5,138,460 A | 8/1992 | Egawa |
| 5,155,586 A | 10/1992 | Levy et al. |
| 5,175,808 A | 12/1992 | Sayre |
| 5,185,808 A | 2/1993 | Cok |
| 5,231,385 A | 7/1993 | Gengler et al. |
| 5,251,022 A | 10/1993 | Kitamura |
| 5,262,867 A | 11/1993 | Kojima |
| 5,307,451 A | 4/1994 | Clark |
| 5,325,449 A | 6/1994 | Burt et al. |
| 5,338,200 A | 8/1994 | Olive |
| 5,396,583 A | 3/1995 | Chen et al. |
| 5,412,764 A | 5/1995 | Tanaka |
| 5,420,533 A | 5/1995 | Park |
| 5,424,773 A | 6/1995 | Saito |
| 5,442,738 A | 8/1995 | Chapman et al. |
| 5,444,478 A | 8/1995 | LeLong et al. |
| 5,446,833 A | 8/1995 | Miller et al. |
| 5,488,674 A | 1/1996 | Burt et al. |
| 5,528,290 A | 6/1996 | Saund |
| 5,544,283 A | 8/1996 | Kaufman et al. |

(Continued)

OTHER PUBLICATIONS

Seitz, "Round Shot Model Super 35", 4 pp. 1997.

(Continued)

*Primary Examiner* — Gims Philippe
(74) *Attorney, Agent, or Firm* — Perkins Coie LLP

(57) ABSTRACT

A camera including a camera lens, acquisition circuitry receiving images via the camera lens, for acquiring a first field of view when the camera lens is in a first orientation and for acquiring a second field of view when the camera lens is in a second orientation, and a viewfinder displaying the second field of view when the camera lens is in the second orientation and displaying at least a portion of the first field of view at least partially composited with the second field of view.

66 Claims, 15 Drawing Sheets

U.S. PATENT DOCUMENTS

| | | |
|---|---|---|
| 5,550,959 A | 8/1996 | Freeman |
| 5,550,960 A | 8/1996 | Shirman et al. |
| 5,561,756 A | 10/1996 | Miller et al. |
| 5,574,836 A | 11/1996 | Broemmelsiek |
| 5,577,176 A | 11/1996 | Friuedman et al. |
| 5,579,456 A | 11/1996 | Cosman |
| 5,583,975 A | 12/1996 | Naka et al. |
| 5,586,231 A | 12/1996 | Florent et al. |
| 5,586,232 A | 12/1996 | Yoshida |
| 5,586,246 A | 12/1996 | Nobori et al. |
| 5,590,250 A | 12/1996 | Lamping et al. |
| 5,594,676 A | 1/1997 | Greggain et al. |
| 5,594,843 A | 1/1997 | O'Neill |
| 5,594,844 A | 1/1997 | Sakai et al. |
| 5,594,845 A | 1/1997 | Florent et al. |
| 5,608,850 A | 3/1997 | Robertson |
| 5,613,048 A | 3/1997 | Chen et al. |
| 5,630,037 A | 5/1997 | Schindler |
| 5,646,679 A | 7/1997 | Yano et al. |
| 5,649,032 A | 7/1997 | Burt et al. |
| 5,650,814 A | 7/1997 | Florent et al. |
| 5,745,126 A | 4/1998 | Jain et al. |
| 5,748,194 A | 5/1998 | Chen |
| 5,963,213 A | 10/1999 | Guedalia et al. |
| 6,112,033 A | 8/2000 | Yano et al. |
| 6,118,595 A | 9/2000 | Miller |
| 6,128,108 A | 10/2000 | Teo |
| 6,144,804 A | 11/2000 | Inoue |
| 6,256,058 B1 | 7/2001 | Kang et al. |
| 6,268,936 B1 | 7/2001 | Truc et al. |
| 6,269,144 B1 | 7/2001 | Ube et al. |
| 6,304,284 B1 | 10/2001 | Dunton et al. |
| 6,333,826 B1 * | 12/2001 | Charles .................... 359/725 |
| 6,657,667 B1 | 12/2003 | Anderson |
| 7,292,261 B1 | 11/2007 | Teo |
| 2002/0175924 A1 | 11/2002 | Yui et al. |
| 2008/0118183 A1 | 5/2008 | Teo |

OTHER PUBLICATIONS

Farace, Joe "Casio QV700 Digital Camera & DP-8000 Digital Photo Printer", 3 pp., Nov. 6, 1997.

"Round Shot", 4pp.

Karney, James "Casio QV-200, QV-700", PC Magazine, 2pp. Feb. 10, 1998.

Erickson, Bob "Round Shot Super 35 13.5.96", 1 pg.

Ryer, Kelly "Casio Adds New Camera to Its Lineup", MacWeek, vol. 11, issue 38, 1 pg., Oct. 2, 1997.

* cited by examiner

VIRTUAL REALITY CAMERA

CROSS REFERENCE TO RELATED APPLICATIONS

This is a continuation of U.S. patent application Ser. No. 09/378,398, filed Aug. 20, 1999 now U.S. Pat. No. 7,292,261.

FIELD OF THE INVENTION

The present invention relates to a camera that acquires fields of view and combines them together.

BACKGROUND OF THE INVENTION

Panoramic images are used to provide immersive "surround" views of scenes, up to 360° in extent. Digital panoramic images can be archived on Internet servers, for access by remote clients. Panoramic images are typically texture mapped into a suitable surface geometry, such as a cylindrical or a spherical geometry. Texture mapping generates a "warped" look to the panorama, and usually converts straight lines into bowed curves.

Client viewer software enables users to interactively view panoramic images by navigating through the panorama. Specifically, for a prescribed view window on a client computer video display, client viewer software converts a selected portion of the panoramic image at a selected level of magnification from cylindrical or other surface geometry to rectilinear geometry, which is appropriate for typical perspective viewing. The converted portion of the panoramic image is displayed in the view window.

A user interface enables a user to dynamically change the selected portion of the panoramic image being viewed. Rapid display of the dynamically changing selected portion gives the viewer a sensation of moving through the panorama, and an experience of being immersed within the surrounding scene. Typically a user interface enables a user to select portions of the panoramic image for display by indicating shifts and changes in magnification of a current portion of the panoramic image, rather than by selecting a new portion without reference to the current portion. Typically the user interface provides for shifting the selected portion up, down, left, right, or other directions, and for reducing or enlarging the current magnification factor, by zooming in and out. Such a user interface can include, for example, keyboard buttons or mouse controls and movements.

Panoramic content creation is typically carried out by a photographer who captures multiple photos of a scene, as he rotates his camera around in a circle. For typical camera lenses such as a 35 mm video camera lens, the photos acquired are characterized by a rectilinear geometry. That is, there exists a linear correspondence between distances in the photo and distances in the scene. Each such photo represents a portion of the scene. The photos are digitized by a digital scanner or, in a case where the photographer uses a digital camera, the photos are digitized by hardware within the camera.

The digital photos are then downloaded to a computer, and a "stitching" application is run to combine the digital photos into a single panoramic image. An example of such a stitching application is assignee's PhotoVista® software.

The photographer can eliminate the combining step by capturing a large portion of a scene by using a wide angle lens, or a hemispherical lens such as the Portal lens system of Be Here Corporation, or a parabolic lens such as the ParaShot™ attachment of CycloVision Technologies, Inc., the latter two of which capture a 360° image in one exposure.

When a photographer creates a panoramic image by combining multiple photos, typically he must be careful to ensure that adjacent fields of view are appropriately aligned as he rotates the camera. When rotating the camera in a horizontal plane, such alignment involves providing for horizontal overlap between adjacent photos, and minimizing vertical displacements outside of the horizontal plane of rotation. Similarly, when rotating the camera in a vertical plane, such alignment involves providing for vertical overlap between adjacent photos, and minimizing horizontal displacements outside of the vertical plane of rotation.

In the ensuing discussion, for the sake of conciseness and simplicity of explanation, panoramas in a horizontal plane of rotation are described, it being understood that the present invention is not limited to panoramas in a horizontal plane of rotation.

When rotating the camera freely in his hand, it is difficult for a photographer to accurately align adjacent fields of view. A reliable way for a photographer to align adjacent fields of view is to mount his camera on a tripod, using a tripod bracket that has equi-spaced notches for rotating the camera in increments of a fixed angle. An example of such a bracket is the Kaidan KiWi™ tripod head. Typically such tripod brackets include one or more spirit levels, so that a photographer can adjust the tripod to keep the axis of rotation of the camera vertically disposed.

Use of a computer for combining acquired photos to produce a panoramic image has several disadvantages. One disadvantage is that the photographer needs to take a computer with him in the field. Otherwise, he cannot create and view the panoramic image while in the field. There are problems associated with both of these situations.

The first option of taking a computer in the field can be difficult, because often a photographer has to hike through un-trodden ground in order to find "the perfect scene." Carrying both a camera and a computer along with his food and gear can be burdensome on the photographer.

Even when the photographer does take a computer with him in the field, he may have to move the camera from its axis of rotation in order to download the photos acquired thereby. As soon as a camera is moved from its axis of rotation, typically the only way to re-generate a panoramic image is to recapture at a new axis of rotation all of the individual photos included in the panorama. For example, if one of sixteen frames of a scene comes out bad, the photographer can correct the problem and recapture such frame as long as the camera has not been moved from its axis of rotation. However, once the camera has been moved from its axis of rotation, a single frame cannot normally be accurately aligned within previously acquired adjacent frames. Thus, even when using a notched tripod bracket, the photographer will normally have to recapture all of the photos included in the panoramic image.

The second option of not creating the panoramic image in the field is problematic, because the photographer cannot see the quality of his panoramic image while in the field. If he subsequently discovers problems with the panoramic image, it may very well be hard, if not impossible, to return to the scene in the same favorable weather and other conditions.

SUMMARY OF THE INVENTION

In a preferred embodiment, the present invention provides a camera that acquires multiple frames and combines them into a panoramic image within the camera. The camera of the present invention eliminates the need for a photographer to use a computer for creating his panoramic image content. He simply acquires the photos to be included within the panoramic image, and the camera produces the final product, a panoramic image of the scene.

The camera of the present invention assists the photographer in accurately aligning adjacent fields of view for his photos. This is preferably achieved by compositing a desired overlap strip from a previously captured field of view onto a current field of view displayed within a viewfinder display of the camera. As the photographer rotates the camera, the current field of view changes accordingly, but the desired overlap strip from the previously captured field of view does not change. When the camera reaches an orientation that produces the desired overlap, the overlap strip within the viewfinder display is seamlessly "matched up" with the current field of view being displayed. This serves as a cue to the photographer to capture the current field of view.

The camera of the present invention also preferably includes a playback mechanism enabling a photographer to interactively view the panoramic image, as it would appear to a user viewing the panoramic image with client viewer software. The playback mechanism is responsive to view control hardware within the camera, that displays appropriate portions of the panoramic image at appropriate levels of magnification as a photographer dynamically navigates his way through the panoramic image.

There is thus provided in accordance with a preferred embodiment of the present invention a camera including a camera lens, acquisition circuitry receiving images via the camera lens, for acquiring a first field of view when the camera lens is in a first orientation and for acquiring a second field of view when the camera lens is in a second orientation, and a viewfinder displaying the second field of view when the camera lens is in the second orientation and displaying at least a portion of the first field of view at least partially composited with the second field of view.

There is further provided in accordance with a preferred embodiment of the present invention a method for converting an image stored in a buffer as a first plurality of color values at a plurality of pixel locations in a first coordinate system, to a corresponding image stored in the buffer as a second plurality of color values at the plurality of pixel locations in a second coordinate system, the second coordinate system being related to the first coordinate system by a non-linear transformation, including the steps of computing color values at pixel locations along an axis within the buffer, using the non-linear transformation, storing the computed color values in the buffer at the pixel locations along the axis, and repeating the computing and storing steps for subsequent axes within the buffer, parallel to the axis.

There is further provided in accordance with a preferred embodiment of the present invention a camera comprising a camera lens, acquisition circuitry receiving images via the camera lens, for acquiring a first frame when the camera lens is in a first orientation and for acquiring a second frame when the camera lens is in a second orientation, and combining circuitry for at least partially combining the first frame and the second frame into a panoramic image.

There is further provided in accordance with a preferred embodiment of the present invention a camera including a camera lens, a memory for storing data for a panoramic image, a display for displaying at least a portion of the panoramic image, and display control circuitry for selecting a portion of the panoramic image to display.

There is further provided in accordance with a preferred embodiment of the present invention a method for combining a first frame and a second frame, including the steps of determining horizontal and vertical offsets for spatially aligning the first and second frames, including the step of summing absolute values of color differences between the first frame and the second frame at a multiplicity of pixel locations, based on trial values for horizontal and vertical offsets, further determining brightness and contrast parameters for chromatically aligning the first and second frames, and generating a panoramic image, including the step of compositing a portion of the second frame onto a portion of the first frame, based on the horizontal and vertical offsets and based on the brightness and contrast parameters.

BRIEF DESCRIPTION OF THE DRAWINGS

The present invention will be more fully understood and appreciated from the following detailed description, taken in conjunction with the drawings in which.

DETAILED DESCRIPTION OF A PREFERRED EMBODIMENT

Figure 1:
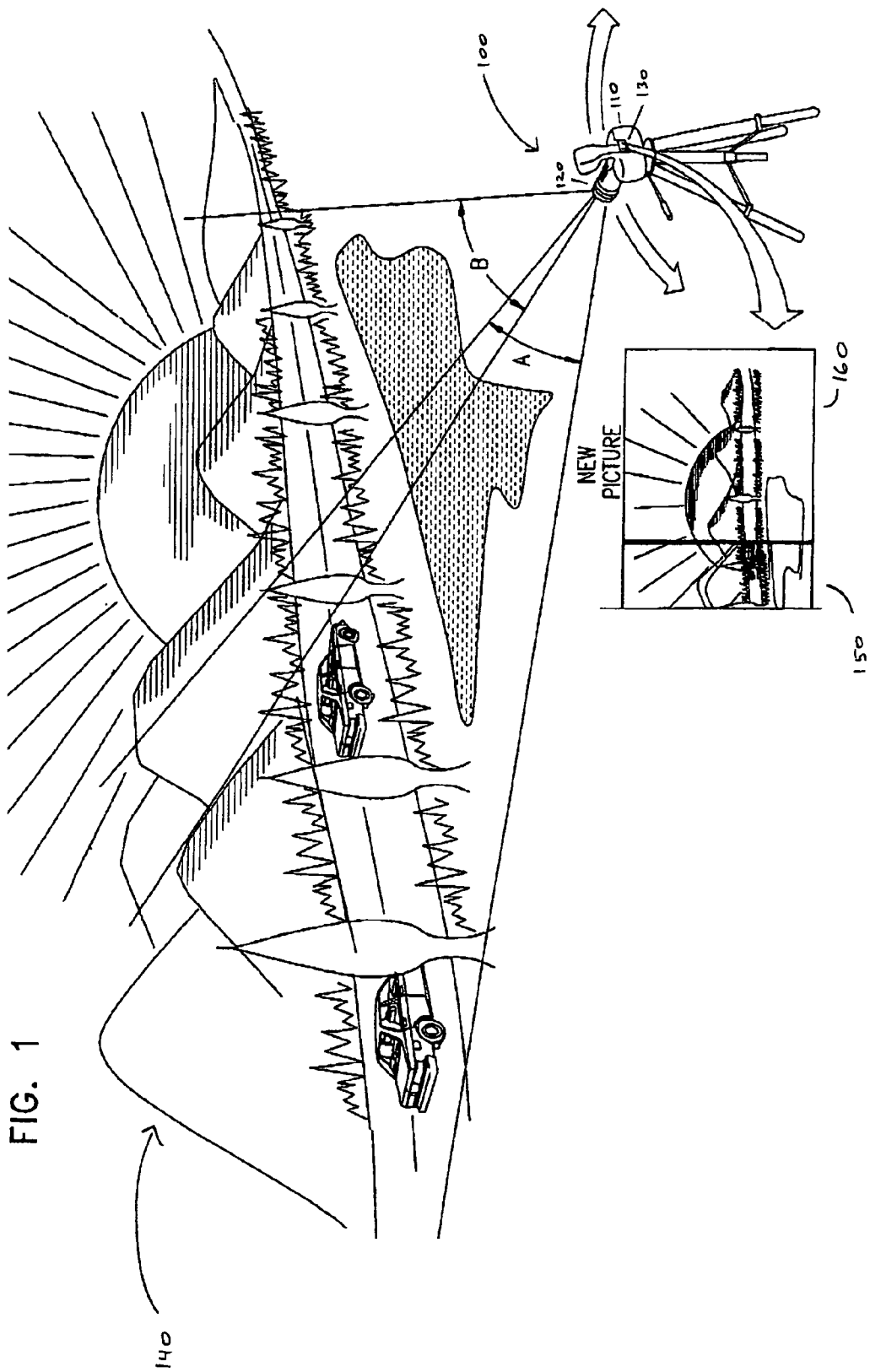
FIG. 1 is a simplified illustration of a camera that produces panoramic images in accordance with a preferred embodiment of the present invention.

The present invention concerns a camera that acquires multiple frames, each representing a field of view, and combines them. Reference is now made to FIG. 1, which is a simplified illustration of a camera that produces panoramic images in accordance with a preferred embodiment of the present invention. A camera 100 of the present invention typically includes standard hardware such as a camera housing 110, a camera lens 120 and a camera viewfinder display 130, along with additional hardware specific to the present invention.

In a preferred embodiment, camera 100 acquires successive frames, each representing a field of view of a panoramic scene 140, designated by angles A and B in FIG. 1, as the camera rotates. Camera 100 aligns, blends and stitches the frames together to form a panoramic image of up to 360° in extent about any desired axis of rotation. In addition camera 100 enables a user to preview a playback of the panoramic image, using viewfinder display 130 that forms part of the camera itself.

A first frame is acquired from a first field of view, subtending angle A. After the first frame is acquired, camera 100 is rotated to a second field of view, subtending angle B. Camera 100 composites a strip 150 from the first frame onto the second field of view 160 seen on viewfinder display 130. Thus viewfinder display 130 simultaneously displays both strip 150 and the current field of view 160, enabling a photographer to see the relative alignment between the first and second fields of view, as described in detail with reference to FIG. 2 hereinbelow. When the first and second fields of view are brought into alignment on viewfinder display 130, the photographer takes a picture and acquires a second frame, representing the second field of view.

The photographer then rotates camera 100 to acquire additional frames, representing additional fields of view (not shown). As each additional frame is acquired and camera 100 is further rotated, camera 100 updates viewfinder display 130 so as to display a strip from such additional frame composited onto a current field of view. The photographer continues taking pictures and acquiring frames representing additional fields of view, until the frames span the entire panoramic scene 140, or a desired portion of panoramic scene 140.

In accordance with a preferred embodiment of the present invention, and as described hereinbelow with reference to FIGS. 4-14, camera 100 combines the acquired frames into a single panoramic image. Viewing the panoramic image interactively by a user as described hereinbelow with reference to FIG. 15, provides an immersive experience, as if the user is present in panoramic scene 140.

Figure 2:
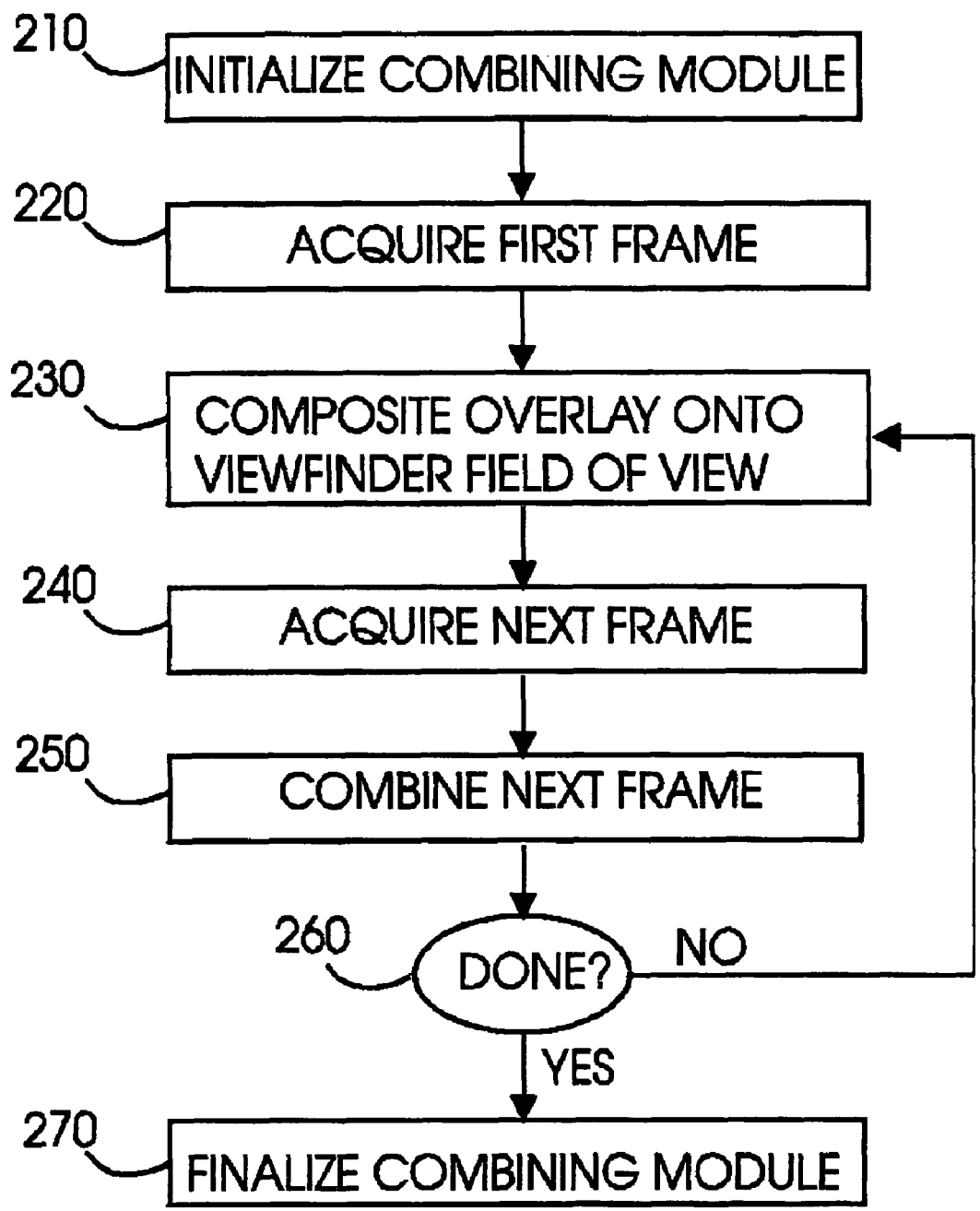
FIG. 2 is a simplified flowchart for the overall frame acquisition and combining that takes place within a camera, in accordance with a preferred embodiment of the present invention.

Reference is now made to FIG. 2, which is a simplified flowchart for the overall frame acquisition and combining that takes place within a camera, in accordance with a preferred embodiment of the present invention. At step 210 a module for combining frames is initialized. At step 220 a first frame is acquired.

At step 230 a loop begins, the first step of which is compositing an overlay from a previously acquired frame onto a current field of view seen on a viewfinder display. The overlay is preferably a vertical strip from the previous frame, as described hereinbelow. At step 240 a next frame, representing the field of view seen on the viewfinder display, is acquired. At step 250 this newly acquired next frame is combined into a panoramic image containing all previously acquired frames. At step 260 a determination is made whether or not further additional frames are to be acquired. If there are additional frames to acquire, execution returns to step 230, at which an overlay from the newly acquired next frame is composited onto a current field of view as seen on the viewfinder display. If there are no additional frames to acquire, the combining module is finalized at step 270, at which any residual data may be combined with the panoramic image, as described hereinbelow with reference to FIGS. 13A and 13B.

It should be apparent to those skilled in the art that the present invention applies to frames acquired as a camera pans horizontally, and to frames acquired as a camera tilts vertically. In the former case, the panoramic image generated is that of a scene projected onto a surface of a cylinder having a vertical axis of revolution. In the latter case, the panoramic image generated is that of a scene projected onto a surface of a cylinder having a horizontal axis of revolution. For the sake of clarity the ensuing description relates to the former situation; namely, that of a camera acquiring successive frames as it rotates approximately within a horizontal plane about a vertical axis of revolution.

It should also be apparent to those skilled in the art that the panoramic images generated in accordance with the present invention need not span a full 360°. They can span any angle up to and including 360°. For the sake of clarity the ensuing description relates to a full 360° panoramic image.

The present invention includes three Stages: (i) acquisition, (ii) combining and (iii) playback. Each of these stages is described hereinbelow.

Acquisition Stage

Preferably, the camera of the present invention includes a user interface for a photographer to indicate when the process for the combining of successive frames starts and stops. For example, the photographer can press a button on the camera housing to indicate when he begins acquiring frames that are to be combined into a panoramic image, and he can press the same button or another button to indicate when he finishes acquiring these frames. Multiple panoramic images can be stored within a single camera memory unit, and the panoramic images can each include different numbers of individual frames.

Preferably, from the time a photographer begins acquiring frames that are to be combined into a panoramic image, the focal length of the camera is kept fixed so that it does not change from one frame to the next, until the photographer acquires all of the frames of the panoramic image. Keeping the focal length fixed can be accomplished by instructing the photographer not to change focus during acquisition of frames relating to a common panoramic image, or by a mechanism which locks the focus automatically from when the photographer indicates the start of a combining process, until the photographer indicates the end of the combining process.

Alternatively, the present invention can also be used to produce panoramic images by combining frames taken at varying focus.

While acquiring frames, the camera of the present invention is typically held so that its lens is approximately horizontally disposed. The camera may include a spirit or other level to assist a photographer in positioning the camera. The rotation of the camera is typically approximately within a horizontal plane about a vertical axis of revolution. Imagining an entire 360° panoramic scene to be laid out on the circumference of a vertically standing cylinder, each frame captured by the camera corresponds to an angular strip of such circumference. The camera of the present invention stitches the frames together so as to generate a single image of the entire cylindrical circumference.

When acquiring frames for the purpose of combining them into a panoramic image, it is desirable that successive frames overlap. In order to accurately align successive frames it is desirable that (i) the overlap area between successive frames have a significant width, typically approximately 25% of the width of each frame, and (ii) the vertical displacement between successive camera positions be relatively small. For example, each frame can have a 30° field of view in the horizontal direction, and the camera can be rotated 22½° per frame. For this example, 360/22½=16 frames are used to produce a full 360° scene.

There are several ways in which a photographer may rotate the camera so that successive frames are aligned as described hereinabove. One such way is to use a tripod head with notches. Each time a new frame is to be acquired, the photographer rotates the camera about the tripod head from one notch to the next.

Alternatively, a portion of the previously acquired frame may be composited onto the current field of view seen on the viewfinder display. In this way the photographer can determine when the camera is rotated to an orientation for which the current field of view overlaps the previously acquired frame by a prescribed amount, such as 25%. Continuing with the above example, supposing the camera is rotating counter-clockwise (left to right) within a panoramic scene, each time a frame is acquired, the rightmost strip of such frame is composited onto the current field of view seen on the viewfinder display as the camera rotates to a new angular orientation. When the camera is rotated so that the current field of view overlaps the field of view of the previously acquired frame, typically by 25% in the horizontal direction, the overlaid strip is brought into alignment, and "matches up" with the current field of view.

Figure 3:
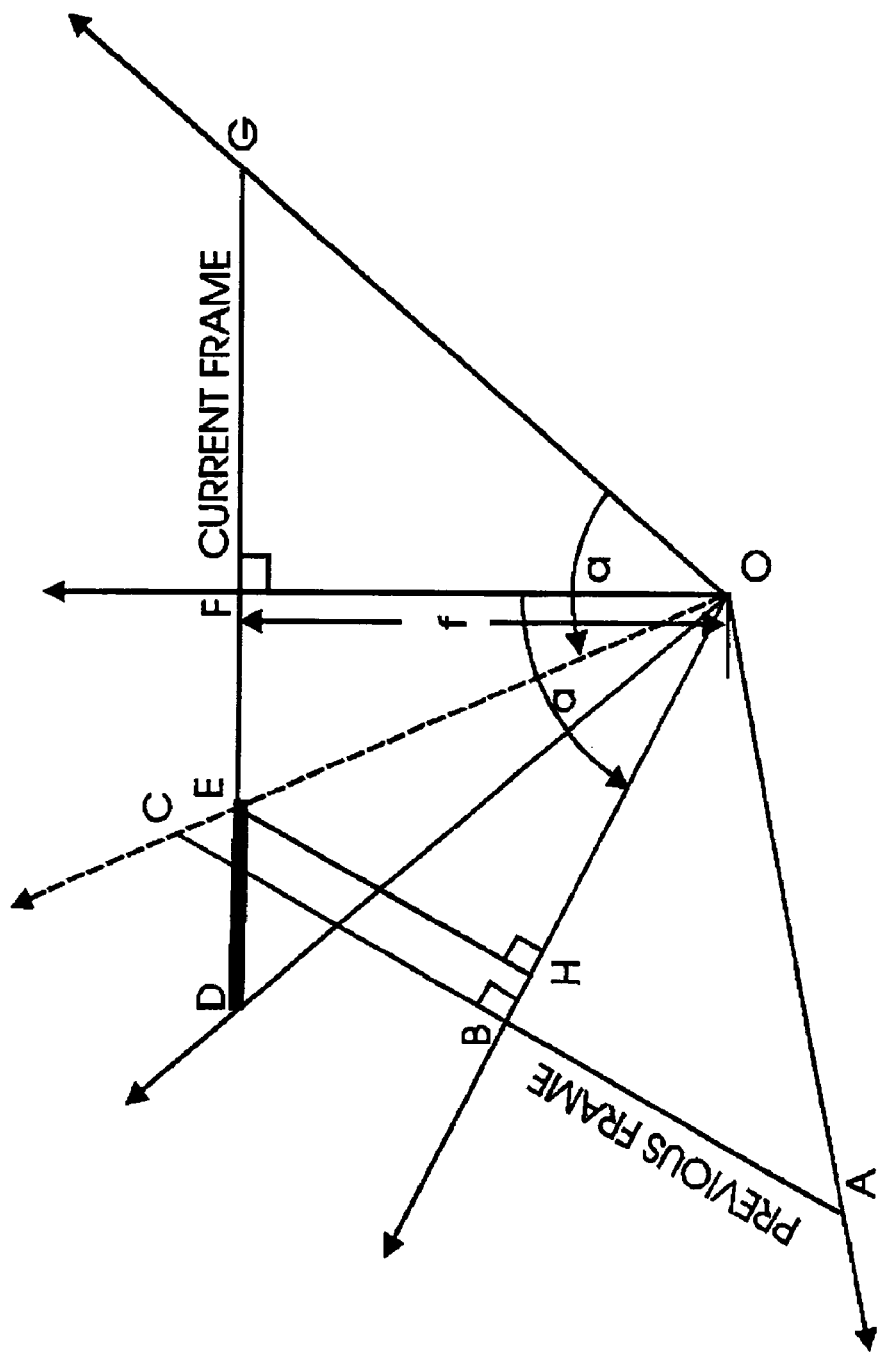
FIG. 3 is a simplified diagram illustrating the geometrical relationship between two successive frames that are acquired by a camera, in accordance with a preferred embodiment of the present invention.

Reference is now made to FIG. 3, which is a simplified diagram illustrating the geometrical relationship between two successive frames that are acquired by a camera, in accordance with a preferred embodiment of the present invention. The line ABC represents the location of a field of view when the camera is orientated along the direction of ray OB. The field of view corresponds to a vertically standing rectangle, perpendicular to the plane of the Figure, with top and bottom sides parallel to line ABC. The frame acquired subtends a field of view angle AOC.

When the camera is rotated through an angle, a, to a new orientation along ray OF, the corresponding field of view is located at line DEFG, and the frame corresponding thereto subtends a field of view angle DOG. The focal length, f, of the camera is preferably fixed during capture of frames of a scene, and, as such, the field of view angles AOC and DOG are equal. For the same reason, the lengths of AC and DG are equal. Moreover, since B is the mid-point of AC and F is the mid-point of DG, the lengths of AB, BC, DF and FG are all equal. The overlap angle is angle DOE, which preferably corresponds roughly to 25% of angle DOG.

In a preferred embodiment of the present invention, the rightmost strip of the frame at line ABC is composited at line DE onto the field of view seen on the viewfinder display. That is, the leftmost 25% of the field of view seen on the viewfinder display contains the rightmost 25% of the previously acquired frame. The resultant overlay can be semi-transparent, typically having 50% opacity, so that the photographer can see both the overlay and the current field of view composited together in the viewfinder display. Alternatively, the overlay and the current field of view can be displayed using alternate pixels, in a checkerboard-like fashion, providing a screening type composite of the overlay on the current field of view, rather than a semi-transparent type composite.

As the camera is rotated from the orientation along ray OB to the orientation along ray OF, the overlay portion DE is brought into alignment with the field of view seen on the viewfinder display. Visual alignment serves as the cue that informs the photographer how far to rotate the camera.

In a preferred embodiment of the present invention the camera includes a visual or audio indicator that signals when the camera is rotated into the correct orientation along ray OF. Such an indicator can be a light that blinks or shines, or a beep or message that is sounded.

The overlap between successive frames can be prescribed in terms of an overlap angle ODE, or alternatively by an overlap width DE. Knowing the focal length, f, conversion from angle ODE to width DE is given by:

$$\angle ODE = \tan^{-1}(DF/f) - \tan^{-1}(EF/f). \quad (1)$$

Due to the non-linearity in going from angle to length, prescribing a 25% angular overlap is different than prescribing a 25% width overlap. That is, requiring that angle DOE be 25% of angle DOG is different than requiring that the length of DE be 25% of the length of DG.

Similarly, the angle of rotation, a, which produces the desired overlap is given by:

$$a = \tan^{-1}(DF/f) + \tan^{-1}(EF/f). \quad (2)$$

It should be appreciated that a 25% overlap, while convenient, is but an arbitrary extent. Any other suitable overlap may be employed.

In order for the overlay to align properly with field of view DEFG when the camera rotates from the orientation along ray OB to the orientation along ray OF, it is necessary to correct the perspective of the rightmost strip of the previously acquired frame to take into account the rotation of the camera. If this perspective correction is not performed, the overlay will be slanted relative to the field of view DEFG, even when the camera is precisely oriented in the direction along ray OF, making it difficult for the photographer to recognize visual alignment in the viewfinder display.

For the purpose of the following discussion, x_src and y_src denote local x and y coordinates relative to an origin at point B within the previous frame positioned at ABC, with x_src running along ABC and y_src running vertically. Similarly, x_dst and y_dst denote local x and y coordinates relative to an origin at point F within the current frame positioned at DEFG, with x_dst running along DEFG and y_dst running vertically. The color values of the previous frame at integral pixel locations (x_src, y_src) are known, having been determined when the previous frame was acquired by the camera.

Perspective correction is performed by determining color values at integral pixel locations (x_dst, y_dst) within the overlap region at DE. Such color values are obtained by identifying for each integral pixel location (x_dst, y_dst) within a destination frame, the corresponding location (x_src, y_src) within a source frame. Preferably the destination frame is the overlap region, and the source frame is the previous frame at ABC. The source frame's color value at (x_src, y_src) is assigned to the overlap color value at (x_dst, y_dst) within the destination frame. For example, referring to FIG. 3, location E in the destination frame corresponds to location C in the source frame, and the color value of the source frame at location C is assigned to the color value of the destination frame at location E.

It can be shown using similar triangles OBC and OHE that the desired correspondence is given by:

$$x\_src = f*(f*\sin(a) + x\_dst*\cos(a))/(f*\cos(a) - x\_dst*\sin(a)), \quad (3)$$

$$y\_src = f*y\_dst/(f*\cos(a) - x\_dst*\sin(a)). \quad (4)$$

In general, the values of x_src and y_src determined by Equations 3 and 4 may not be integral values corresponding to discrete pixel locations, and as such the determination of the color value of the previous frame at location (x_src, y_src) may involve interpolating color values at surrounding pixel locations.

It can be seen from Equation 4 that the perspective correction is a uniform rescaling of vertical lines, since y_src is proportional to y_dst at a fixed location x_dst. Thus, for each value of x_dst, once x_src is calculated according to Equation 3, color values within the entire vertical line situated at x_dst in the overlap region can be determined by re-scaling color values within a vertical line situated at x_src in the previous frame. In this way color values for the entire overlap region can be computed, and the overlap region can be composited onto the current field of view as seen on the viewfinder display.

Combining Stage

As successive frames are acquired, they are combined by spatially aligning, chromatically aligning and stitching them together into a panoramic image, as described hereinbelow. In carrying out combining, the present invention preferably also texture maps the frames from rectangular to cylindrical geometry. That is, each frame is mapped from rectilinear coordinates to cylindrical coordinates, by means of projection thereof through a reference viewing point, prior to being combined with previously acquired frames.

In a preferred embodiment, the present invention determines the relative alignment between two successive frames. Specifically, the present invention calculates the horizontal and vertical displacement between successive frames, in order to properly combine them.

The combining stage thus includes four sub-stages: (i) texture mapping of an acquired frame from rectilinear to cylindrical coordinates, (ii) spatial alignment, (iii) chromatic alignment and (iv) stitching the texture mapped frame into the panoramic image. These sub-stages are described hereinbelow.

Texture Maiming from Rectilinear to Cylindrical Coordinates

Figure 4:
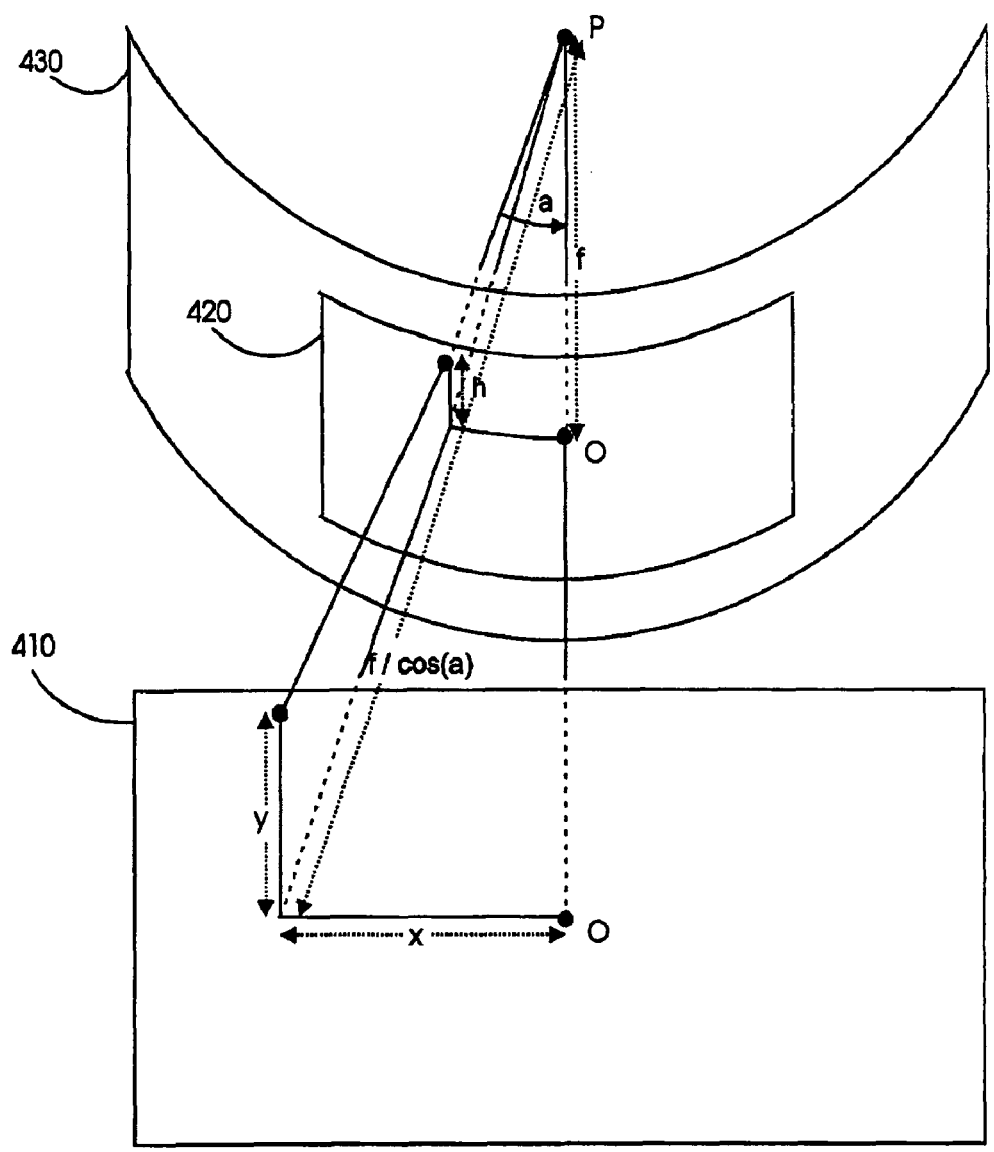
FIG. 4 is a first simplified illustration of texture mapping from rectilinear coordinates to cylindrical coordinates, in accordance with a preferred embodiment of the present invention.

Reference is now made to FIG. 4 which illustrates texture mapping pa from rectilinear coordinates to cylindrical coordinates, in accordance with a preferred embodiment of the present invention. A local rectilinear coordinate system 410 includes coordinates axes x and y relative to an origin O. Rectilinear coordinate system 410 corresponds to the pixel coordinates of a frame acquired by the camera of the present invention. Typically frames acquired by optics that can be approximated by a pin-hole camera have a rectilinear geometry, and the pixel data representing such frames consist of color values at a rectilinear grid of integral pixel locations.

Also shown in FIG. 4 is a cylindrical coordinate system 420 including an angular coordinate, a, and a height coordinate, h. Cylindrical coordinate system 420 corresponds to a portion of the surface of a cylinder 430.

Coordinate systems 410 and 420 are related in that (i) the local rectilinear coordinate system 410 is vertically disposed and tangent to the cylindrical coordinate system 420 at point O, and (ii) the origins of both coordinate systems correspond to the same point.

It can be seen from FIG. 4 that the texture mapping between the rectilinear coordinates (x, y) and the cylindrical coordinates (a, h) is obtained geometrically by identifying each point (x, y) in coordinate system 410 with the point (a, h) on the surface of the cylinder that lies on the ray joining a viewing point P at the center of cylinder 430 with point (x, y). Specifically, as can be seen from FIG. 4, the texture mapping is given by:

$$x = f*\tan(a), \quad (5)$$

$$y = h/\cos(a). \quad (6)$$

As is the case with Equation 4 above, the rectilinear to cylindrical texture mapping is a uniform rescaling of vertical lines, since y is proportional to h at a fixed angle, a.

Figure 5:
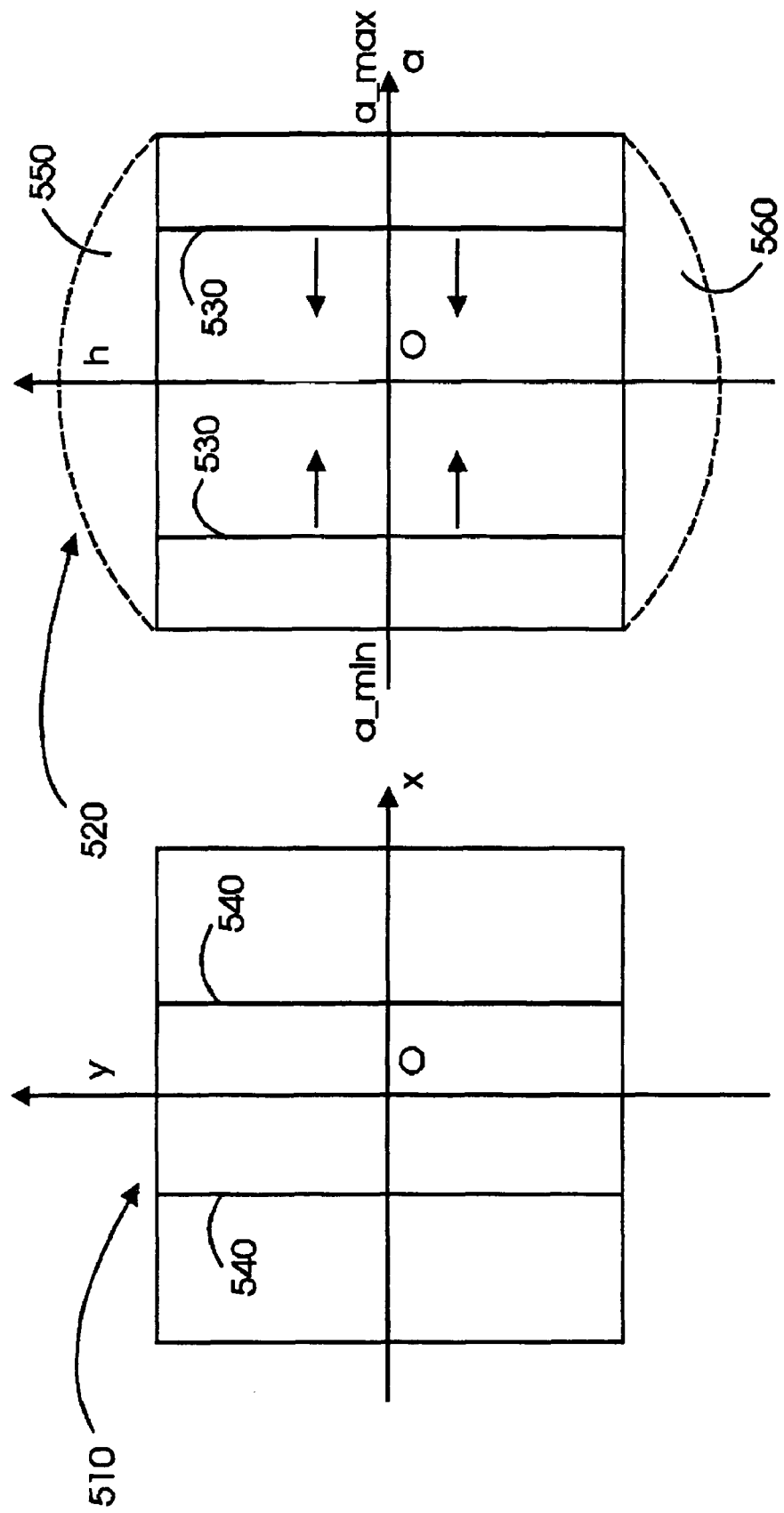
FIG. 5 is a second simplified illustration of texture mapping from rectilinear coordinates to cylindrical coordinates, in accordance with a preferred embodiment of the present invention.

Reference is now made to FIG. 5, which further illustrates texture mapping from rectilinear coordinates to cylindrical coordinates, in accordance with a preferred embodiment of the present invention. A local rectilinear coordinate plane 510 includes coordinate axes x and y. Rectilinear coordinate plane 510 corresponds to rectilinear coordinate system 410 shown in FIG. 4, which in turn corresponds to the pixel coordinates of a frame acquired by the camera of the present invention. Also shown in FIG. 5 is a cylindrical coordinate plane 520 including an angular coordinate, a, which ranges between a lower limit a_min and an upper limit a_max, and a height coordinate, h. Cylindrical coordinate system 520 corresponds to cylindrical coordinate system 420 shown in FIG. 4, which in turn corresponds to a portion of cylindrical surface 430.

When a frame is acquired by the camera, color values at integral pixel locations (x, y) within rectilinear plane 510 are determined. Texture mapping is performed by assigning color values to integral pixel locations (a, h) within cylindrical coordinate plane 520. A color value can be assigned to each pixel location (a, h) within cylindrical coordinate plane 520 by determining the color at the corresponding location (x, y) of the frame within rectilinear coordinate plane 510. In general, location (x, y) as determined from Equations 5 and 6 above, may not coincide with an integral pixel location, and as such, the color value of the frame at location (x, y) may be determined by interpolating color values at surrounding integral pixel locations.

For each integral value of the angular coordinate, a, within cylindrical coordinate plane 520, color values of the texture mapped cylindrical plane within an entire vertical line 530 situated at position "a" can be determined from color values within an appropriately re-scaled vertical line 540 of the rectilinear plane situated at position x. Vertical lines 530 of cylindrical coordinate system 520 are kept at a fixed length, so as to eliminate the top and bottom polar regions 550 and 560, respectively.

The values of the lower and upper limits, a_min and a_max, respectively, can be determined by substituting the limiting values of x into Equation 5. Specifically, $$a\_min = \tan^{-1}(x\_min/f), \, a\_max = \tan^{-1}(x\_max/f), \quad (7)$$

where x_min and x_max are the corresponding limiting values of x within the rectilinear plane.

Each positive integral value of the angular coordinate "a" can be represented as r*a_max, where r has a value between 0 and 1. A useful observation relating to Equation 6 is that the function tan(a) is a convex function over the range of angles a between 0 and 90°. Since tan(0)=0, it follows that tan(r*a) <r*tan(a). In turn, it follows from Equations 6 and 7 that the value of x corresponding to an angle a=r*a_max satisfies the inequality x<r*x_max. In other words, relative to the respective scales x_max and a_max, the vertical line 440 is closer to origin O than is the vertical line 430.

As a consequence of this property, it is possible to overwrite a memory buffer in which the rectilinear frame pixel color values are stored, to store instead the cylindrical texture-mapped pixel color values. Specifically, if processing of vertical lines advances from right to left, beginning at a=a_max and ending at a=0, each vertical line of pixel data within a memory buffer storing the rectilinear data can be overwritten to store a corresponding vertical line of cylindrical pixel data. Since each vertical line of cylindrical data only references rectilinear data to the left of such vertical line, none of the rectilinear data that has been overwritten is subsequently needed.

For negative values of the angular coordinate "a", a symmetric relationship holds. Specifically, each vertical line of cylindrical data only references rectilinear data to the right of such vertical line. Thus if processing of vertical lines advances from left to right, beginning at a=a_min and ending at a=0, the pixel data within a memory buffer storing the rectilinear data can be overwritten to store the cylindrical data.

Thus by implementing a left-to-right pass for vertical lines to the left of origin O, and a right-to-left pass for vertical lines to the right of origin O, as indicated in FIG. 5, the present invention writes cylindrical data over rectilinear data within a memory buffer initially storing the rectilinear data. That is, the buffer that stores the rectilinear data is converted to a buffer storing the cylindrical data.

This is referred to as "in-place" texture mapping, since the texture mapped cylindrical data is written in the same place (i.e. memory locations) where the rectilinear data is initially stored. Theoretically each vertical line 530 within cylindrical coordinate system 520 to the right of origin O corresponds to a vertical line 540 within rectilinear coordinate system 510 to the right of origin O that is closer to origin O on a relative scale. However, due to the integral nature of pixel locations and the effect of rounding, it may occur that color values within a vertical line 530 depend on color values within a vertical line 540 at the same relative location. Moreover, for systems that sub-sample chrominance color values, such as YCC422, it may even occur that color values in a vertical line 530 within cylindrical coordinate system 520 depend on color values in a vertical line 540 within rectilinear coordinate system 510 that is at a relative location further away from the origin O than line 530. In such a case, were the rectilinear pixel data to be overwritten, data necessary for processing additional vertical lines would be lost.

For these reasons, a preferred embodiment of the present invention maintains an auxiliary memory buffer of two vertical lines of rectilinear data, the two vertical lines being the current line and its predecessor. The auxiliary buffer is used whenever rectilinear data at the current line position or the previous line position is needed to determine the pixel data in the current cylindrical line 530. After each successive cylindrical line 530 is processed, the auxiliary buffer is updated to reflect the position of the next line.

It should be appreciated by persons skilled in the art that the values of coordinates x, y, a and h are relative values. Typically these values are not centered at 0, but range from 0 to N−1, where N is the total number of pixel locations in a given direction, and is determined by the sampling frequency of the hardware within the camera that acquires the frames. For purposes of clarity it is assumed in this description that the angular coordinate, a, and the horizontal rectilinear coordinate, x, range from negative to positive values. However, the in-place processing described hereinabove can be adapted to any pixel indexing method.

For hardware applications such as a camera, in-place processing is advantageous in that it reduces memory requirements, since separate memory buffers are not required for both the rectilinear and the cylindrical data. Moreover, the left-to-right pass and the right-to-left pass can be implemented in parallel, since there is no shared data used in the two passes. In a preferred embodiment of the present invention, when the camera acquires a new rectilinear frame and stores its pixel data within a memory buffer, the pixel data for the frame is converted in place from rectilinear to cylindrical coordinates.

Figure 6:
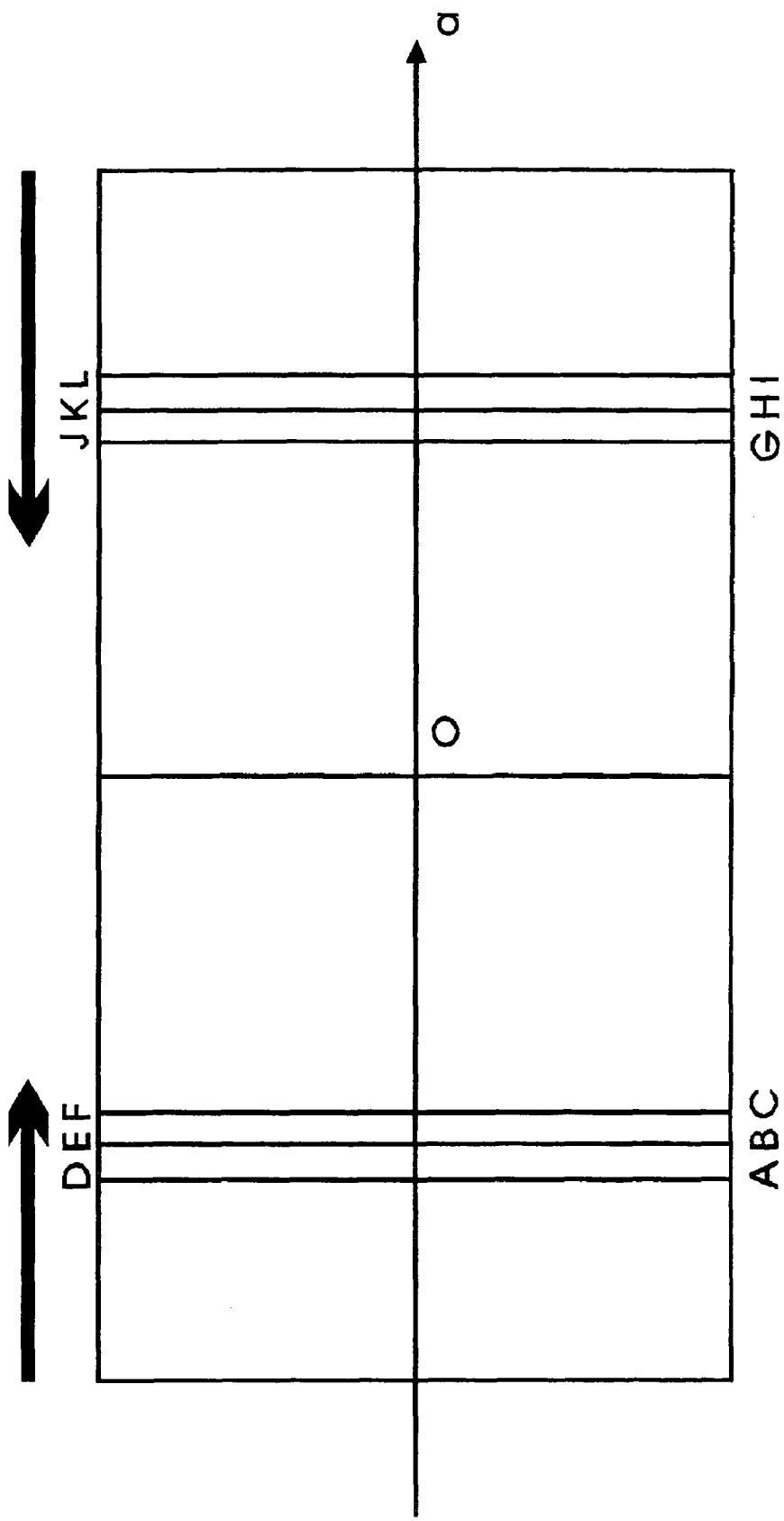
FIG. 6 is a simplified illustration of two-pass processing for a rectilinear to cylindrical texture map transformation, in accordance with a preferred embodiment of the present invention.

Reference is now made to FIG. 6, which illustrates two-pass processing of a rectilinear to cylindrical texture map transformation, in accordance with a preferred embodiment of the present invention. A memory buffer initially stores rectilinear pixel data for a frame acquired by a camera. A left-to-right pass proceeds by iterating over vertical lines, such as lines AD, BE and CF, to the left of an origin O. A right-to-left pass proceeds by iterating over vertical lines, such as lines IL, HK and GJ, to the right of origin O.

Each iteration is controlled by advancing an index indicating a position of a vertical line being processed. Initially rectilinear data in the first vertical line is saved into an auxiliary buffer. As each iteration of the left-to-right pass proceeds and the position of the vertical line being processed advances from left to right, the auxiliary buffer is updated so as to contain rectilinear data at both the current vertical line position and the previous vertical line position. This is accomplished by renaming current line data within the auxiliary buffer as previous line data, and copying rectilinear data from the current line into the auxiliary buffer as current line data. For example, when the left-to-right processing reaches vertical line BE, the auxiliary buffer contains rectilinear data at lines AD (previous line) and BE (current line), and when the left-to-right processing reaches vertical line CF, the auxiliary buffer contains rectilinear data at lines BE (previous line) and CF (current line).

As each iteration of the left-to-right pass proceeds, cylindrical line data, such as data for line AD, is determined, preferably by means of Equations 5 and 6, and written over the rectilinear line data at the same pixel locations within the memory buffer.

Similarly, as each iteration of the right-to-left pass proceeds and the position of the vertical line being processed advances from right to left, the auxiliary buffer stores rectilinear data from the current and previous lines, and cylindrical line data is written over rectilinear line data at the same line position. For example, when the right-to-left processing reaches vertical line HK, the auxiliary buffer contains rectilinear data at lines IL (previous line) and HK (current line), and cylindrical data at pixel locations along line HK is written over the rectilinear data at pixel locations along line HK in the memory buffer.

Spatial Alignment

Motion estimation is used to determine horizontal and vertical displacements between two successive frames, so as to be able to spatially align them. In a preferred embodiment of the present invention the successive frames being analyzed consist of pixel data that was previously converted from rectilinear to cylindrical coordinates by a texture mapping transformation of the type described above, such as a mapping governed by Equations 5 and 6.

Figure 7:
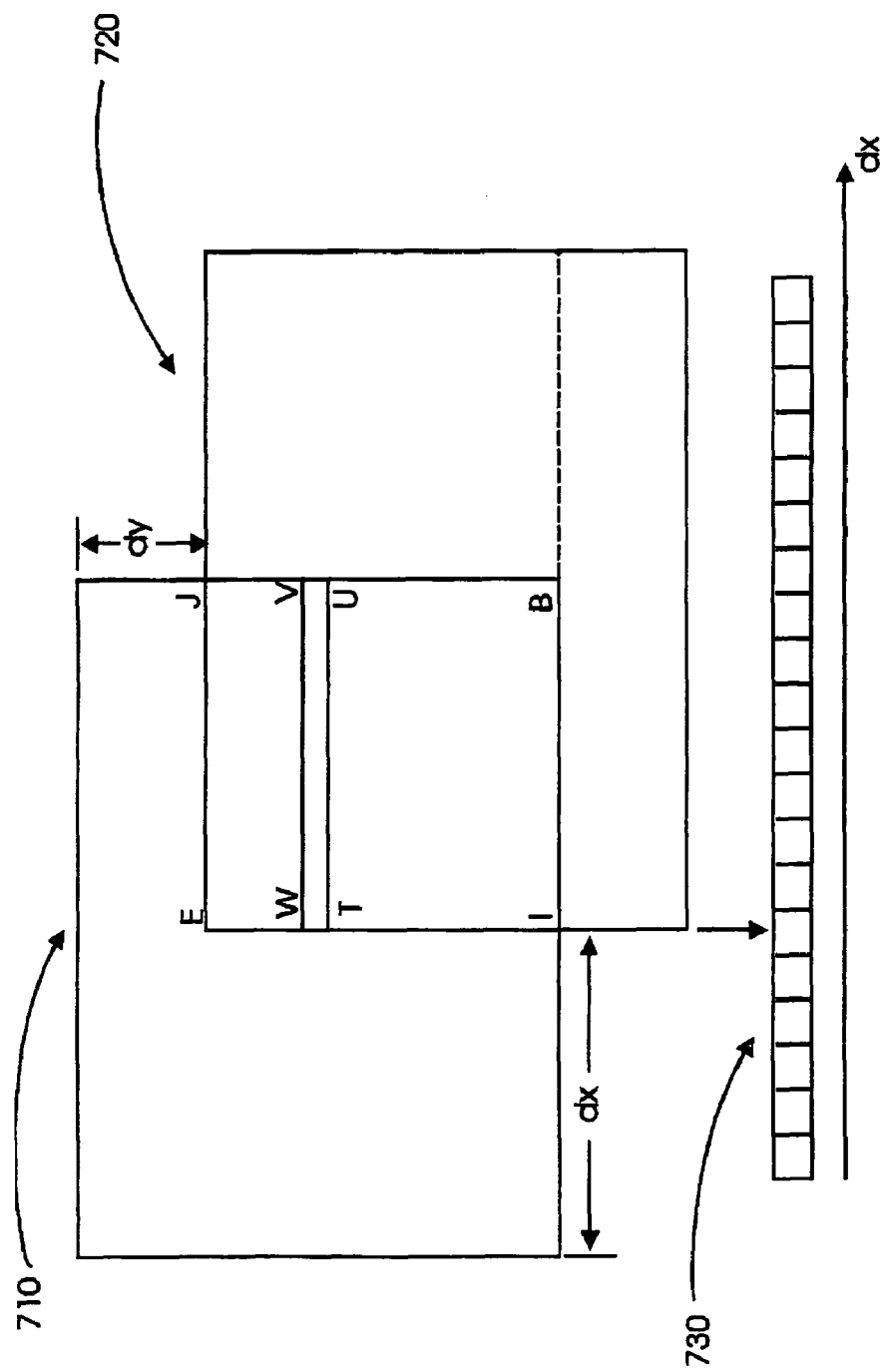
FIG. 7 is a simplified illustration of horizontal motion estimation, in accordance with a preferred embodiment of the present invention.

Reference is now made to FIG. 7, which is a simplified illustration of horizontal motion estimation in accordance with a preferred embodiment of the present invention. Shown in FIG. 7 are two successive frames 710 and 720, offset horizontally by a horizontal offset, dx, and offset vertically by a vertical offset, dy. It is assumed that dy is significantly smaller than dx; that is, that the camera's vertical position does not change significantly as the camera is rotated.

Pursuant to the above assumption, the estimation of dx and dy can be separated into an estimate for dx based on there being no vertical offset, followed by an estimate for dy based on knowledge of the horizontal offset, dx. This is simpler computationally than estimating both dx and dy simultaneously. It should be appreciated by persons skilled in the art that other estimation algorithms can be employed, including algorithms that estimate both dx and dy simultaneously, without departing from the spirit of the present invention.

As mentioned hereinabove, it is assumed in the present description that a photographer is acquiring images by rotating a camera horizontally (i.e. by changing the pan angle of the camera). It should be appreciated by those skilled in the art that in the circumstance where the photographer is acquiring images by rotating a camera vertically (i.e. by changing the tilt angle of the camera), than an appropriate assumption to make is that dx is significantly smaller than dy, and correspondingly it is appropriate to first estimate dy based on there being no horizontal offset, and afterwards to estimate dx based on knowledge of dy.

Referring back to FIG. 7, a table 730 is constructed tabulating for each value of dx from among a suitable range of values (referred to as a "search range"), a measure of the error in using the horizontal offset dx to align frame 710 with frame 720. Specifically, the error is measured by a normalized sum of absolute differences (SAD) of color values between frame 710 and frame 720 in their region of overlap IBJE. The SAD corresponding to a selected value of dx is given by $$SAD[dx] = \sum_{\substack{pixel\ locations\ (x,y) \\ in\ overlap\ region}} |I_1(x+dx, y) - I_2(x, y)| \qquad (8)$$

where $I_1(x+dx, y)$ denotes the color value of frame 710 at pixel location (x+dx, y), and $I_2(x, y)$ denotes the color value of frame 720 at pixel location (x, y). The overlap region decreases in size as the value of the horizontal offset, dx, increases. Thus in order to normalize the SAD for purposes of comparison, a preferred embodiment of the present invention uses the ratio SAD/(# of pixel locations in the overlap region), which reflects the SAD per unit pixel, as a measure of the error in using the horizontal offset dx to align the frames.

In order to conserve memory, the SAD is preferably computed by calculating the sum in Equation 8 along horizontal lines within the overlap region, such as line TUVW in FIG. 6, and these horizontal line sums are then accumulated to form a total overlap region sum. Specifically, each horizontal line sum is accumulated into the table entry of table 730 indexed by the value of dx. Pseudo-code for carrying out this accumulation is given by the following algorithm:
For each displacement dx:
 SAD[dx]=0;
For each horizontal line at position y:
 For each displacement dx:
  SAD[dx]+=LineSAD(dx, Frame1Line, Frame2Line).
   Another advantage of accumulating horizontal line SADs to calculate the overall SAD is that the individual line SADs can be calculated in parallel. In a preferred embodiment of the present invention, the hardware for calculating an individual line SAD can be replicated multiple times, with each version processing a different line simultaneously.

Figure 8:
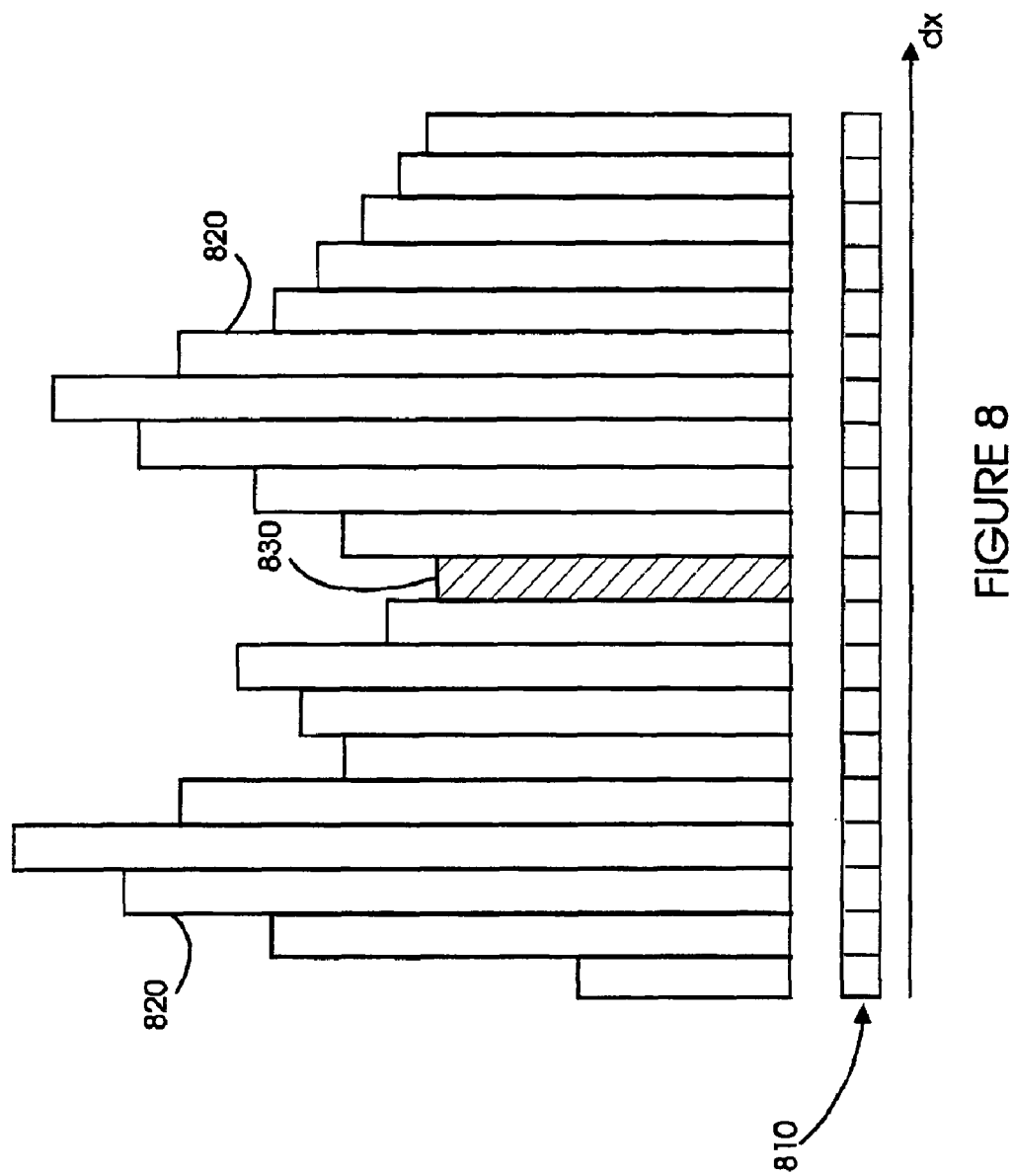
FIG. 8 is a simplified illustration use of a histogram to estimate horizontal offset between successive frames, in accordance with a preferred embodiment of the present invention.

Reference is now made to FIG. 8 which illustrates use of a histogram to estimate horizontal offset between successive frames, in accordance with a preferred embodiment of the present invention. Table 810 tabulates for each index dx, the normalized SAD when dx is used as a horizontal offset to align two successive frames. The normalized SADs are illustrated as histogram rectangles 820 above each corresponding value of dx. The height of each histogram rectangle 820 indicates the value of the normalized SAD.

In a preferred embodiment, the present invention uses as an estimate of the true horizontal offset between successive frames, a value of dx which is the minimum of the local minima among the heights of the rectangles 820. Such a value corresponds to the hatched rectangle 830. It is noted that a global minimum is not used since a global minimum can correspond to a displacement at the boundary of the search range.

After the horizontal offset, dx, has been estimated, similar processing can be carried out to estimate the vertical offset, dy. Specifically, the appropriate SAD to use for a selected value of dy is given by:

$$SAD[dy] = \sum_{\substack{pixel\ locations\ (x,y) \\ in\ overlap\ region}} |I_1(x+dx, y+dy) - I_2(x, y)|, \qquad (9)$$

where dx is the estimated horizontal offset.

The SAD for vertical offsets can be calculated by accumulating partial sums over vertical lines, for the sum in Equation 9, and the true offset can be estimated by finding the minimum of the local minima of the SAD[dy] values.

Due to the symmetry of the operations in estimating dx and dy; the same hardware can be used for performing both estimates.

In a preferred embodiment of the present invention the pixel data in the previous and current frames is downsampled horizontally prior to motion estimation. Horizontal downsampling is preferably performed by averaging multiple vertical lines together. In addition, the data in the previous and current frames is also downsampled vertically prior to motion estimation. Vertical downsampling is preferably performed by averaging multiple horizontal lines together. Four downsampled frames are thus produced from the previous and current frames—two horizontally downsampled frames and two vertically downsampled frames.

After downsampling the previous and current frames, the horizontally downsampled frames are reflected spatially by transposing their rows into columns. This makes it possible to use the same hardware to carry out a high pass filter (described hereinbelow) for both the horizontally and vertically downsampled frames, and to use the same hardware to carry out the offset estimation for estimating both the horizontal and vertical offsets.

The downsampled frames are filtered by a one-dimensional high pass filter in the horizontal direction. An example of a high pass filter used in an embodiment of the present invention is the filter with coefficients [—1, 2, −1]. High pass filtering is needed to make the error measure robust to global illumination changes. Since the horizontally downsampled frames are reflected, as described hereinabove, one-dimensional high pass filtering in the horizontal direction is equivalent to filtering the unreflected frames in the vertical direction.

After high pass filtering is performed, the horizontal offset dx is estimated using the vertically downsampled frames, assuming that the vertical offset is zero. Then the vertical offset dy is estimated using the horizontally downsampled frames and using the estimated horizontal offset dx. As mentioned hereinabove, since the horizontally downsampled frames are reflected, the same hardware can be used to estimate both dx and dy.

Use of downsampled frames is advantageous in that computational time is reduced. In addition, the assumption of a zero vertical offset while estimating the horizontal offset dx is more justifiable when using a vertically downsampled frame than when using an original full-size frame. The vertical offset may not be zero, due to the vertical motion of the camera when it is rotated by the photographer, but it is typically small. Downsampling scales the vertical offset by the sampling frequency, making the vertical offset even smaller.

Chromatic Alignment

As described hereinabove, motion estimation is used to spatially align two frames. Blending is a form of color correction used to chromatically align two frames. Assignee's co-pending application U.S. Ser. No. 08/922,732, filed on Sep. 3, 1997 and entitled "A Method and System for Compositing Images" describes techniques for blending images.

In a preferred embodiment, the present invention uses a color correction model involving brightness and contrast parameters. Brightness and contrast adjustment of a color value, I, operate according to the linear equation $$I' = b + c*I,  \quad (10)$$

where b is a brightness parameter, c is a contrast parameter and I' is the adjusted color value. For two frames, such as frames 710 and 720 (FIG. 7), one can compute optimal values of brightness and contrast parameters, which best bring the color values of the frames into alignment with one another.

In a preferred embodiment of the present invention, rather than apply brightness and contrast adjustment to one of the frames, in order to chromatically align it with the other frame, equal and opposite adjustments are made to both frames. If the color of one frame is adjusted by a brightness parameter, b, then the color of the other frame is adjusted by −b; and if the contrast of one frame is adjusted by a factor, c, then the contrast of the other frame is adjusted by 1/c.

A preferred embodiment of the present invention uses histogram matching to find values of b and c for which the adjusted colors of the frames have the same means and variances within an overlap region. The values of b and c used in a preferred embodiment of the present invention are given by:

$$c = \sqrt[4]{\frac{\langle I_1^2 \rangle - \langle I_1 \rangle^2}{\langle I_2^2 \rangle - \langle I_2 \rangle^2}}, \quad b = \frac{1}{2}\left(\frac{1}{c}\langle I_1 \rangle - c\langle I_2 \rangle\right), \quad (11)$$

where the above averages are computed according to:

$$\langle I_1 \rangle = \frac{1}{N} \sum_{\substack{pixel\ locations\ (x,y) \\ in\ overlap\ region}} I_1(x, y), \langle I_1^2 \rangle = \frac{1}{N} \sum_{\substack{pixel\ locations\ (x,y) \\ in\ overlap\ region}} I_1^2(x, y), \quad (12)$$

$$\langle I_2 \rangle = \frac{1}{N} \sum_{\substack{pixel\ locations\ (x,y) \\ in\ overlap\ region}} I_2(x, y), \langle I_2^2 \rangle = \frac{1}{N} \sum_{\substack{pixel\ locations\ (x,y) \\ in\ overlap\ region}} I_2^2(x, y), \quad (13)$$

and N denotes the total number of pixels in the overlap region.

The corresponding color corrections are given by $$I_1' = -b + {}^*c^{-1}*I_1, I_2' = b + c*I_2. \quad (14)$$

It will be appreciated by persons skilled in the art that the description hereinabove relates to a single color channel, denoted by I. For multiple color channels, separate brightness and contrast factors can be computed independently.

Figure 9:
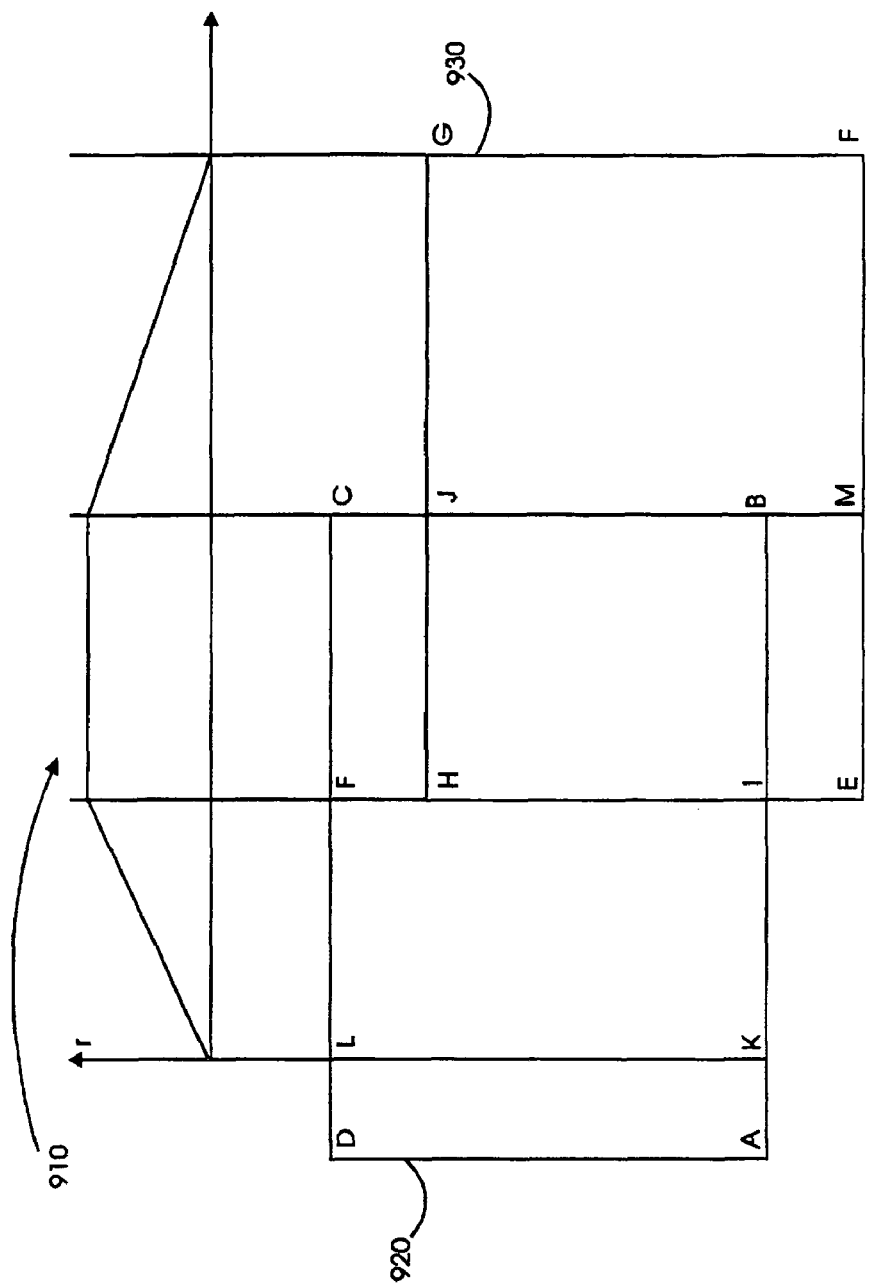
FIG. 9 is a simplified illustration of the application of color correction to each of two frames, in accordance with a preferred embodiment of the present invention.

Reference is now made to FIG. 9, which illustrates the application of color correction to each of two frames, ABCD and EFGH, in accordance with a preferred embodiment of the present invention. The brightness and contrast parameters determined above in Equation 11 are based on color values of two frames within an overlap region. Once these parameters are determined, it is desirable to adjust color values in each of the frames within the overlap region accordingly. In order to avoid noticeable artifacts at the boundary of the overlap region, it is desired to continuously apply and taper the color value adjustments beyond the region of overlap, rather than not apply them at all outside the region of overlap.

Based on Equation 14 above, full color correction amounts to addition of dI=I'−I to color values I within a frame. Partial color correction amounts to addition of r*dI to color values I, where r is a multiplicative factor between 0 and 1. The extreme value r=0 corresponds to no color correction, and the extreme value r=1 amounts to full color correction.

Shown at the top of FIG. 9 is a graph 910 of the factor r as a function of horizontal position within previous frame 920 (rectangle ABCD) and current frame 930 (rectangle EFGH). When applying color correction to previous frame 920, the factor r is set to r=1 between the overlap positions C and F. That is, full color correction is applied at pixel locations within region IBCF. To the left of position F the factor r tapers down from r=1 to r=0 as the position moves leftward from point F to point L. To the left of point L no color correction is applied to previous frame 920.

Similarly, when applying color correction to current frame 930, the factor r is set to r=1, indicating full color correction, between the overlap positions H and J. That is, full color correction is applied at pixel locations within region EMJH. To the right of position J the factor r tapers down from r=1 to r=0 as the position moves rightward from point J. Preferably, as will be described hereinbelow, the factor r tapers down to r=0 at the rightmost boundary of current frame 930, at position G.

In an alternate embodiment of the present invention, less than full color correction is applied inside the overlap region. In this embodiment the maximum value of r in graph 910 is set to a value less than 1, preferably a value of approximately 0.75. Thus, for example, between overlap positions C and F the factor r is set to 0.75, to the left of position F it tapers from r=0.75 down to r=0, and to the right of position C it also tapers from r=0.75 down to r=0.

In this alternate embodiment, the previous and current frames are not sufficiently color corrected so as to match each other. This is acceptable because the subsequent image stitching step transitions the previous buffer smoothly into the current frame, as described hereinbelow. Such less than full color correction is useful as it produces a smoother color transition between the two frames.

In a preferred embodiment of the present invention the color alignment can be carried out in parallel with the spatial alignment. Even though the horizontal and vertical offsets, dx and dy, respectively, which determine the overlap region are not calculated until completion of spatial alignment, nevertheless a default overlap region can be used for the purpose of histogram matching to carry out color alignment.

Stitching

As each successive frame is acquired, it is stitched together with a previous frame. After being stitched with the current frame, a portion of the previous frame is appended to a panoramic image by storing a portion of its data within the panoramic image, as described hereinbelow. As each portion of each additional frame is stored within the panoramic image, the size of the panoramic image grows.

Figure 10:
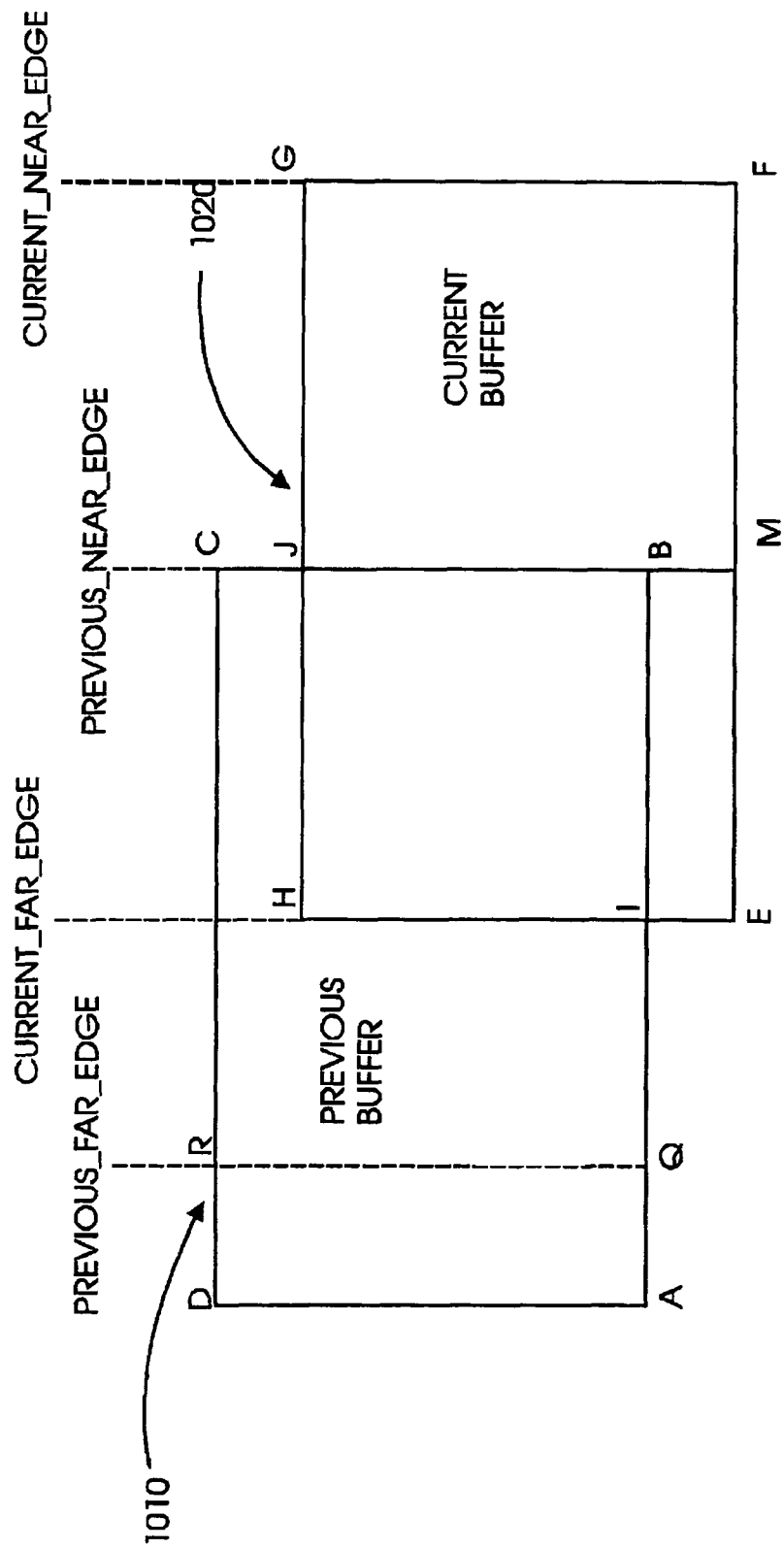
FIG. 10 is a simplified illustration of a portion of a previous frame that is stored within a panoramic image.

Reference is now made to FIG. 10 which illustrates the portion of a previous frame ABCD that is stored within a panoramic image. FIG. 10 refers to a situation subsequent to acquisition of a current frame. A memory buffer 1010 referred to as a previous buffer stores the previously acquired frame, and a memory buffer 1020 referred to as a current buffer stores the currently acquired frame. The frame data has preferably been converted into cylindrical coordinates, and color corrected as described hereinabove.

Portion AQRD of previous buffer 1010 has already been stored within the panoramic image. Portion QBCR of previous buffer 1010 has not yet been stored within the panoramic image. The unstored portion of buffer 1010 is designated by means of two edge delimiters, a previous far edge QR and a previous near edge BC. The region between the previous far edge and the previous near edge contains the unstored pixel data.

The entire current buffer 1020 has not yet been stored within the panoramic image, and as such, the delimiting edges for its unstored data are current far edge EH, which is the leftmost edge of current buffer 1020, and current near edge FG, which is the rightmost edge of current buffer 1020.

After the current frame is stitched together with the previous frame, the unstored data of the previous frame in region QBCR is stored within the panoramic image. The current buffer is then renamed to be the previous buffer and the far and previous edge delimiters are adjusted as described hereinbelow.

It is noted that an advantage of the present invention is that the same memory used to store the individual acquired frames is also being used to store the panoramic image. Specifically, as each portion of each frame is stored within the panoramic image, the individual frame data is overwritten, thus obviating the need to use duplicate memory to store both the panoramic image and the individual frames included within it. This elimination of duplicate memory would not be achievable if it were necessary to preserve the individual frames.

Figure 11:
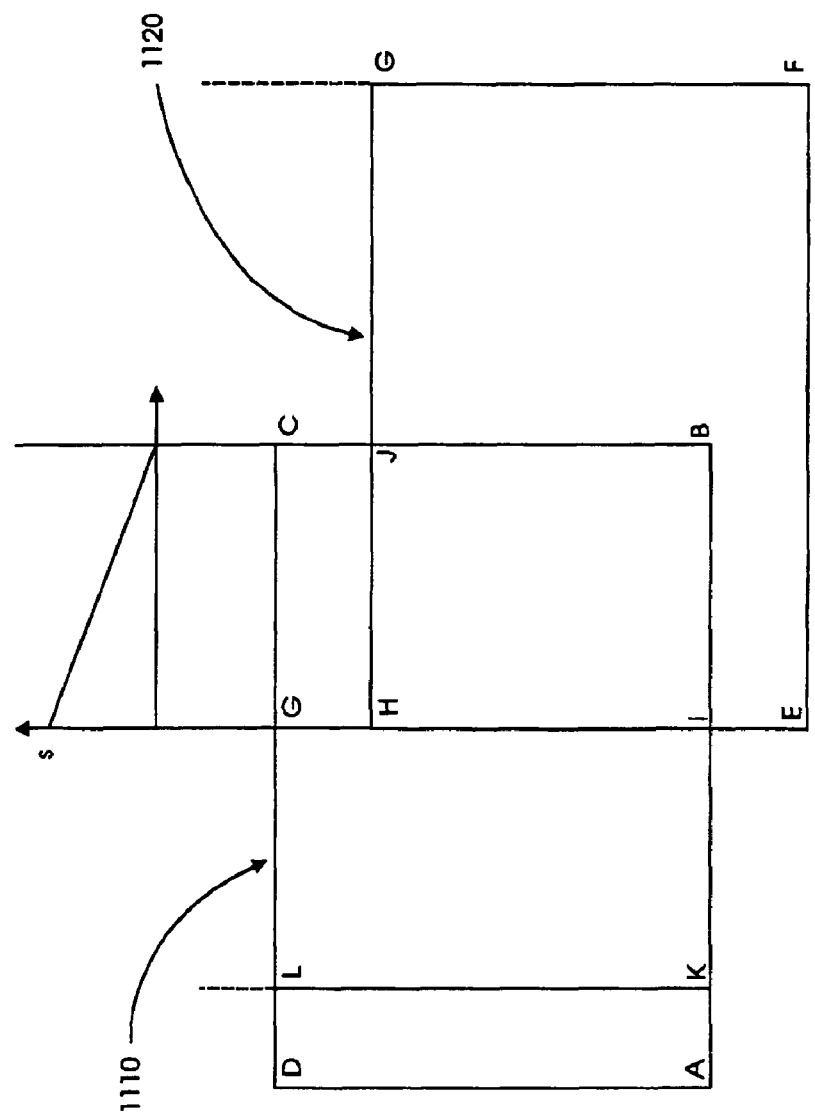
FIG. 11 is a simplified illustration of the stitching of a current frame with a previous frame, in accordance with a preferred embodiment of the present invention.

Reference is now made to FIG. 11, which illustrates the stitching of a current frame together with a previous frame, in accordance with a preferred embodiment of the present invention. The stitching is performed by adjusting the color values, $I_1$, of the previous frame, based on the color values $I_2$ of the current frame, according to:

$$I_1' = s*I_1 + (1-s)*I_2, \quad (15)$$

where s is a weighting factor between 0 and 1 that controls the amount of color adjustment. Preferably the color values $I_1$ and $I_2$ have already been adjusted for chromatic alignment, as described hereinabove. As shown in FIG. 11 the weighting factor s tapers down from s=1 at the left edge GI of the overlap to s=0 at the right edge BC of the overlap. Since it is only the color values of a previous frame 1110 that are being adjusted, Equation 16 is only applied to the data in previous frame 1110 within the region IBCG.

After the current frame is stitched with the previous frame, as described hereinabove, the unstored data within previous buffer 1010 (FIG. 10) between the previous far edge and the previous near edge is stored within the panoramic image. Current buffer 1020 then becomes the previous buffer, in preparation for acquisition of the next frame, and its delimiting edges are set so that the to previous far edge becomes edge MJ and the previous near edge becomes edge FG.

Referring back to FIG. 9, it is noted that preferably once data is stored within the panoramic image, no further adjustments are made to the data. Thus the color correction within the previous frame should only go as far back as the previous far edge. That is, preferably the edge LK in FIG. 8 at which the factor r tapers down to r=0 does not extend leftward beyond the previous far edge QR (FIG. 10). In a preferred embodiment of the present invention, the edge LK coincides with the previous far edge QR, so that the color correction spreads backwards as far as it can, without affecting data that has already been stored within the panoramic image. Similarly, the color correction spreads forwards as far as it can, and thus preferably the factor r tapers down to r=0 at the right edge FG of the current frame, as mentioned hereinabove.

While the method of stitching illustrated in FIG. 10 results in a smooth transition between the two frames, it may produce ghosting when the respective content in the two frames differ. For example, if a person is in the overlap region within one frame but not the other, a ghost-like reproduction of that person will be present in the final panorama. If the compositing is confined to a portion of overlap region IBCG to the left or to the right of the person, then the resulting panorama will either include the person entirely or not include the person at all, respectively.

Figure 12:
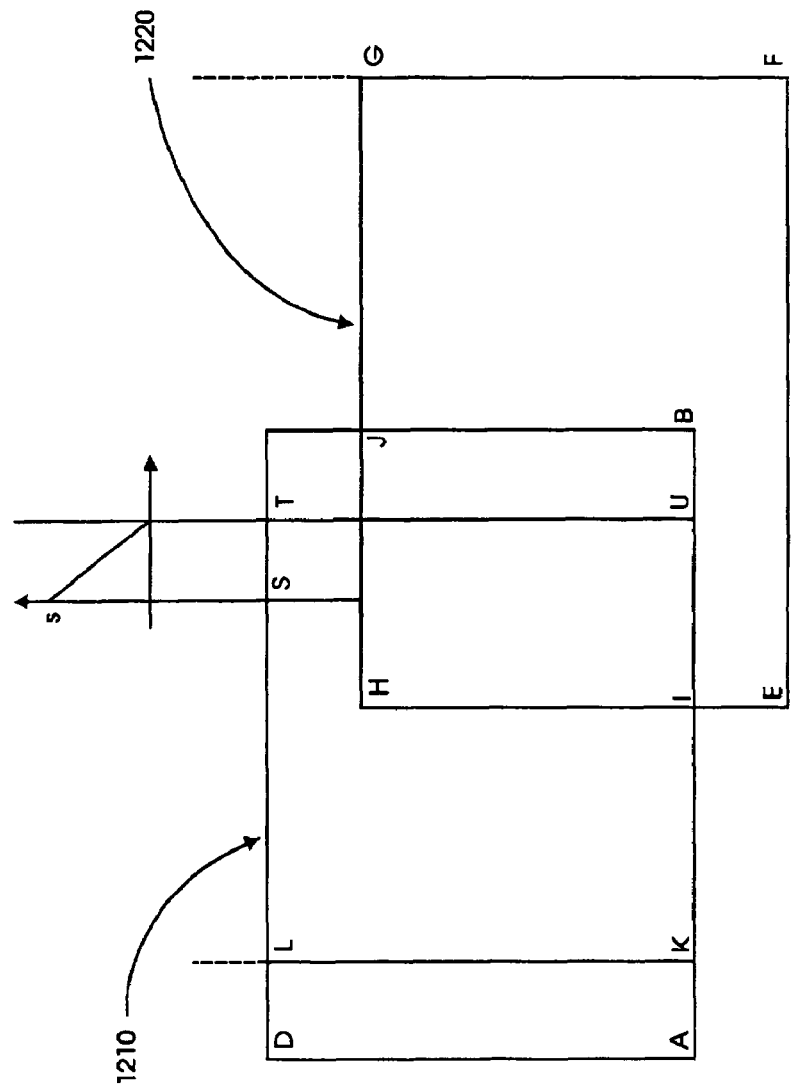
FIG. 12 is a simplified illustration of the stitching of a current frame together with a previous frame in a manner that avoids ghosting, in accordance with a preferred embodiment of the present invention.

Reference is now made to FIG. 12, which illustrates the stitching of a current frame together with a previous frame in a manner that avoids ghosting, in accordance with a preferred embodiment of the present invention. Whereas in FIG. 11 the compositing region is a wide region between positions F and C, in FIG. 12 the compositing region is a narrower region between positions S and T.

Determination of an appropriate compositing region is carried out by determining the horizontal position of the center of the compositing region, and by determining the width of the compositing region. The horizontal position of the center of the compositing region can be taken as that position which yields a least sum of absolute differences (SAD) error for a specified error metric. One such error metric is the SAD between color values of the two frames at corresponding pixel locations along vertical lines within their overlap region. This SAD is computed after the current frame is spatially aligned with the previous frame.

The width of the compositing region can be fixed, or determined using the same error metric. For example, the width of the compositing region can be taken based on the set of horizontal positions at which the above referenced SAD is small.

When the compositing region is only a portion of the overlap region, the previous near edge delimiter is no longer the right edge of the previous frame. Instead, it is set to the right edge of the compositing region. That is, only the portion KUTL of the previous frame is stored within the panoramic image.

For hardware efficiency, it is desirable to store fixed-width vertical strips of data within the panoramic image during each store operation. The width of such a chunk can be selected based on memory and data transfer limitations, and in general may not correspond to the width of successive overlap regions.

Figure 13A:
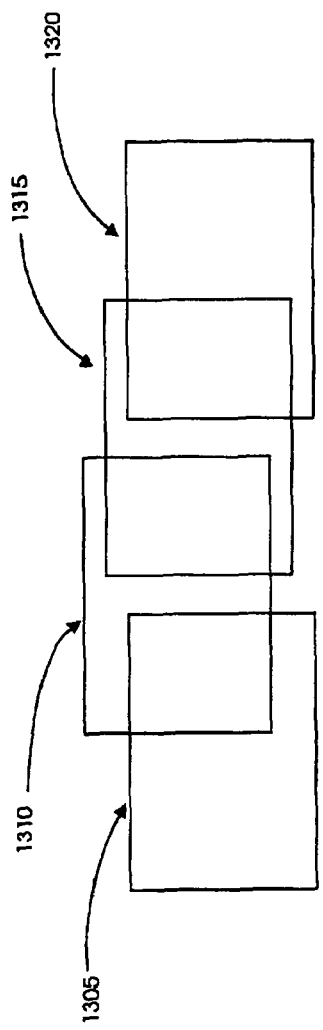
FIGS. 13A and 13B are simplified illustrations of the storing of data within a panoramic image in vertical data strips of a fixed width, in accordance with a preferred embodiment of the present invention.
Figure 13B:
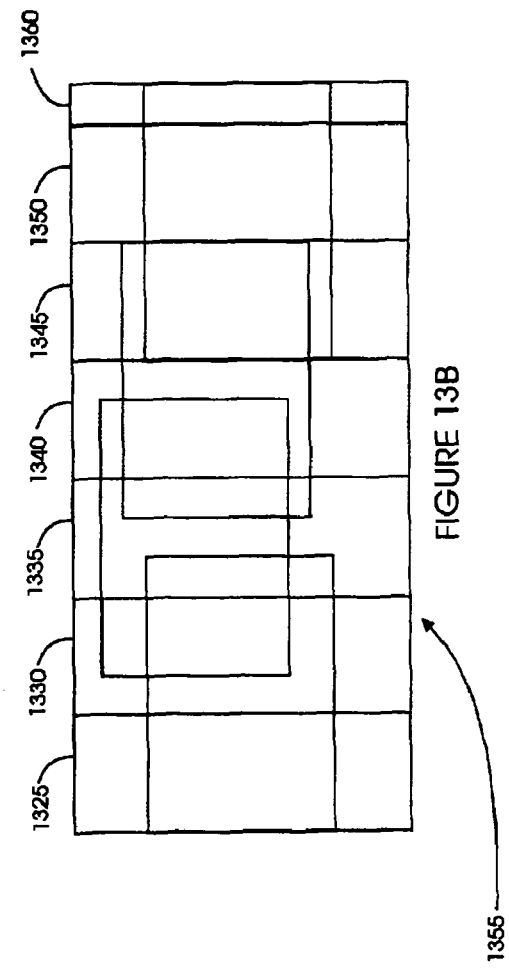

Reference is now made to FIGS. 13A and 13B, which illustrate the storing of data within a panoramic image in vertical data strips of a fixed width, in accordance with a preferred embodiment of the present invention. Shown in FIG. 13A is a series of four successive frames 1305, 1310, 1315 and 1320 acquired by the camera of the present invention. Shown in FIG. 13B are six vertical strips of data 1325, 1330, 1335, 1340, 1345 and 1350 saved into a panoramic image 1355. In addition there is also shown a residual vertical data strip 1360 which is stored into panoramic image 1355 after the last frame 1320 is acquired.

Figure 14:
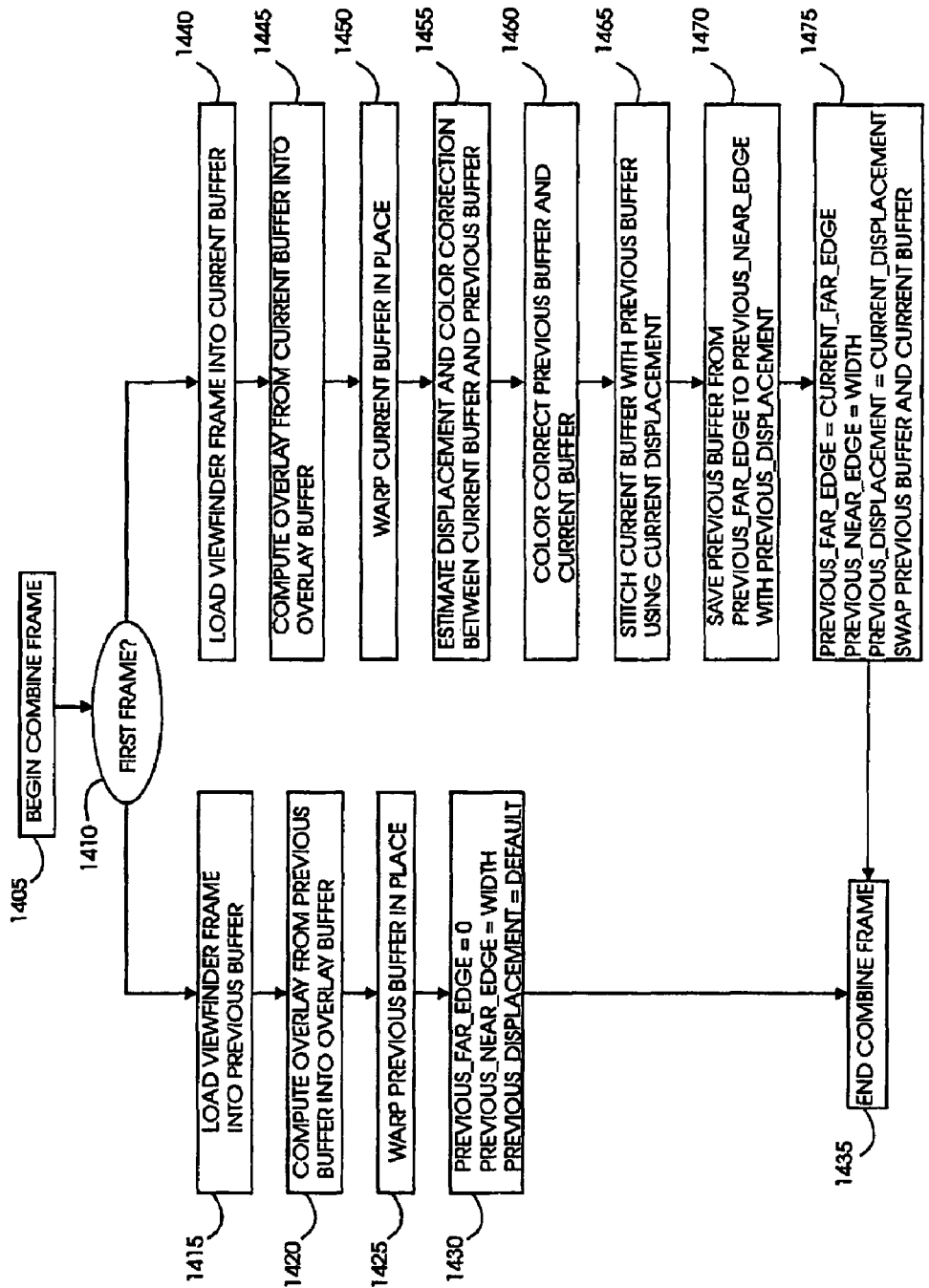
FIG. 14 is a simplified flowchart of a stitch module operative in accordance with a preferred embodiment of the present invention.
Figure 15:
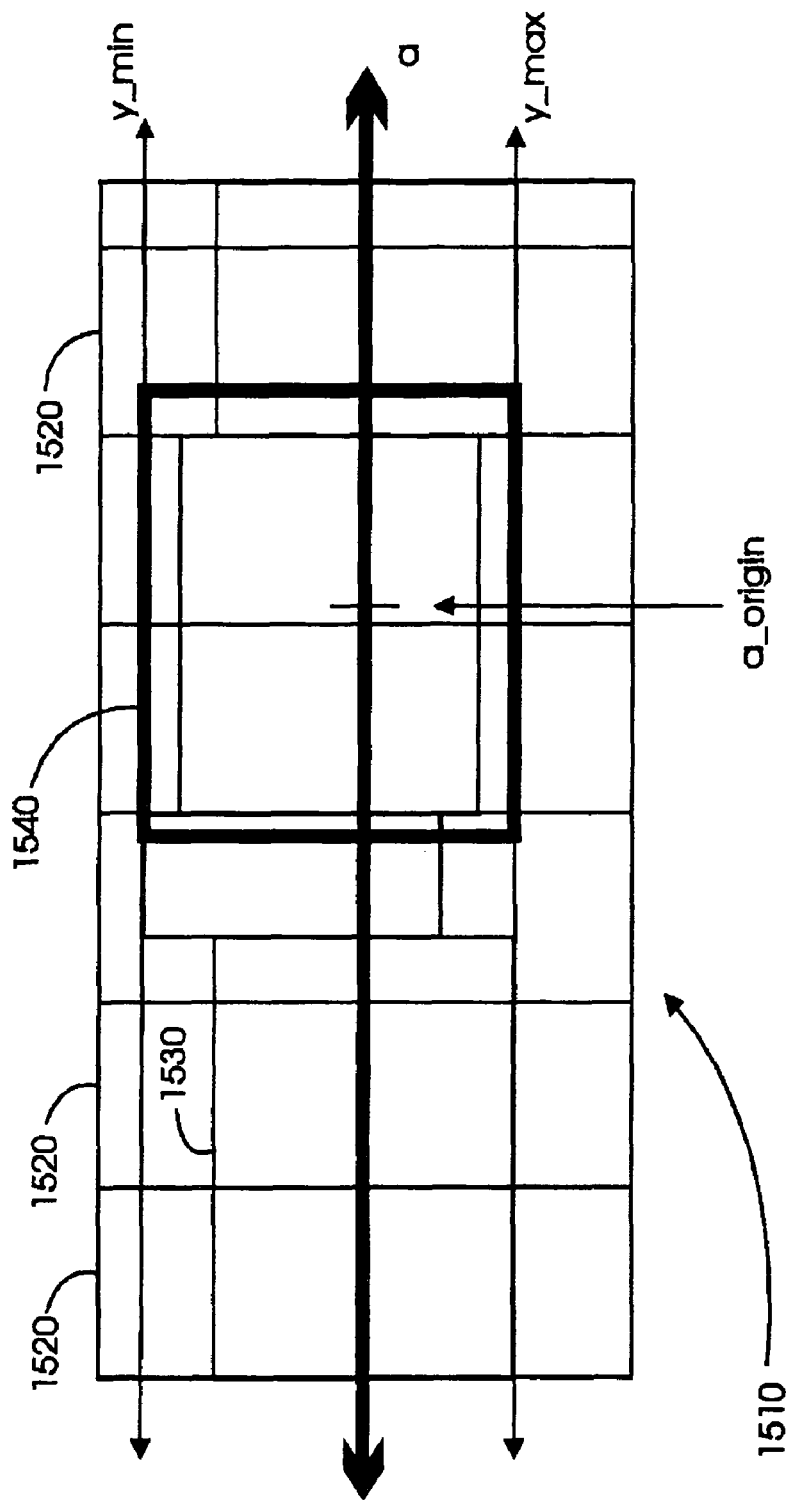
FIG. 15 is a simplified illustration of display of a portion of a panoramic image in rectilinear coordinates within a view window, in accordance with a preferred embodiment of the present invention.

Reference is now made to FIG. 14, which is a simplified flowchart of a combine module operative in accordance with a preferred embodiment of the present invention. At step 1405 the combine module begins and a first frame is acquired. At step 1410 a determination is made whether or not the current frame being combined is the first frame. If it is the first frame, execution continues to step 1415, where a memory buffer, referred to as the "previous buffer," is loaded with pixel data from the viewfinder. At step 1420 a rightmost portion of the frame within the previous buffer is processed for perspective correction as described hereinabove with reference to FIG. 3 and Equations 3 and 4, and stored into an overlay buffer.

At step 1425 the pixel data in the previous buffer is warped in place from rectilinear to cylindrical coordinates, as described hereinabove with reference to FIGS. 4-6. It is noted that the warping is preferably performed after the overlay data has been computed, since the overlay data is required to be rectilinear in form. At step 1430 the previous far and near edges are set. Such edges delimit the portion of data in the previous buffer that has not yet been stored within a panoramic image, as described hereinabove with reference to FIG. 10. Since the panoramic image contains no data at this point in the processing, the previous far edge is set to zero and the previous near edge is set to the rightmost edge of the buffer. Execution then continues at step 1435, ending the combine module for the first frame.

If the frame being processed at step 1410 is determined not to be the first frame, then execution continues to step 1440, where the pixel data from the viewfinder is loaded into a memory buffer referred to as the "current buffer." At this stage the data from the overlay buffer is composited onto the viewfinder display. At step 1445 a rightmost portion of the frame in the current buffer is perspectively corrected and stored within the overlay buffer, overwriting the previous contents of this buffer. At step 1450 the current buffer is warped in to place from rectilinear to cylindrical coordinates. Again, it is noted that the warping is preferably performed after the overlay data has been computed, since the overlay data is required to be rectilinear in form.

At step 1455 spatial alignment offset parameters dx and dy are estimated as described hereinabove with reference to FIGS. 7 and 8, and color alignment brightness and contrast parameters b and c are estimated as described hereinabove with reference to Equations 11-13. At step 1460 the data in the previous and current buffers is adjusted for color using the estimated brightness and contrast parameters, as described hereinabove with reference to FIG. 9 and Equation 14. At step 1465 the current buffer is stitched with the previous buffer, as described above with reference to FIG. 11 and Equation 15.

At step 1470 the data from the previous buffer between the previous far and previous near edge delimiters is stored within the panoramic image. As described hereinabove with reference to FIG. 11, storage of data within the panoramic image is preferably done in units of fixed-width vertical data strips. At step 1475 the previous buffer is swapped with the current buffer (by swapping pointers), the previous far edge is set to the current far edge, and the previous near edge is set to the rightmost edge of the current buffer. Finally, at step 1435 the combine module is complete.

Playback Stage

In a preferred embodiment, the camera of the present invention includes the capability of playback of a panoramic image generated by combining acquired frames. After the frames have been acquired by a photographer and combined by the camera to form a panoramic image, as described hereinabove, the panoramic image can be interactively viewed by the photographer. Such viewing enables a photographer to judge the quality of the panoramic image while at the scene, and re-acquire the frames if the quality is not acceptable.

Interactive viewing is performed by converting a portion of the panoramic image from cylindrical coordinates to rectilinear coordinates within the viewfinder or other display window. The conversion is performed by inverting Equations 5 and 6 above. Specifically, for each integral pixel location (x, y) in the viewfinder display, the color value at location (x, y) is set to the color value of the panoramic image at location (a, h) where the coordinates a and h are given by:

$$a = \tan^{-1}(x/f) + a\_origin, \quad (16)$$

$$h = y^* \cos(a), \quad (17)$$

where a_origin denotes the angular coordinate at the center of the viewfinder display. Generally the values of a and h computed by Equations 16 and 17 are not integral pixel values, and as such the color of the panoramic image at location (a, h) is determined by interpolating color values at surrounding pixel locations.

As noted above with reference to Equation 6, Equation 17 corresponds to a re-scaling of vertical lines. Specifically, for each integral value of x, pixel color values along a vertical line positioned at x for the viewfinder display are obtained from color values along a re-scaled vertical line positioned at a for the panoramic image.

Interactive viewing of the panoramic image is performed by changing the angular position a_origin. Changing a_origin corresponds to panning left or right through the panoramic scene.

Preferably the camera of the present invention includes a user interface for interactively changing the value of a_origin, thereby displaying moving portions of the panoramic image, corresponding to navigation therethrough. Such a user interface may be provided by buttons on the camera housing, or by a mechanism that couples motion of the camera itself to the setting of a_origin. In this latter embodiment, the photographer simply rotates the camera in order to display corresponding portions of the panorama as one pans to the left or to the right.

In a preferred embodiment, the present invention also provides the capability for interactively zooming in and out of the panoramic image during playback. Zooming in and out can be activated by the photographer pressing one or more zoom buttons, or by his adjusting the focus of the camera. In this latter embodiment, the photographer simply adjusts the focus of the camera in order to display corresponding zoomed in and out views of the panorama.

User interfaces within a camera for interactive playback of a panoramic image are described in assignee's co-pending application U.S. Ser. No. 08/938,366, filed on Sep. 26, 1997, entitled "Virtual Reality Camera," the contents of which are hereby incorporated by reference.

Reference is now made to FIG. 15 which illustrates interactive display of a portion of a panoramic image in rectilinear coordinates within a view window, in accordance with a preferred embodiment of the present invention. Shown in FIG. 15 is a panoramic image 1510 consisting of vertical data strips 1520 of fixed width. Panoramic image 1510 includes multiple frames 1530 that were acquired by the camera of the present invention. Panoramic image 1510 is typically stored using pixel locations within a cylindrical coordinate system.

A photographer can view the panoramic image interactively in playback mode. Interactive playback is controlled by selecting a view window 1540 for viewing a portion of the panoramic image in rectilinear coordinates. View window 1540 is dynamically adjusted by the photographer, enabling him to view various portions of the panoramic image. The center of the view window has an angular coordinate a_origin, that is used in Equation 16 to perform the cylindrical to rectilinear coordinate transformation. As the photographer pans to the right, the value of a_origin increases, and as the photographer pans to the left, the value of a_origin decreases. If the panoramic image spans a full 360° to then view window 1540 wraps around from one end of panoramic image 1510 to the other end when a_origin approaches its upper and lower limits.

Also illustrated in FIG. 15 are the top and bottom delimiters y_min and y_max, respectively, for the panoramic image. The top delimiter y_min is preferably set to the top position of the topmost frame 1530, and the bottom delimiter y_max is preferably set to the bottom position of the bottommost frame 1530.

In reading the above description, persons skilled in the art will realize that there are many apparent variations that can be applied to the methods and systems described. For one such variation the panoramic image can be generated to have a surface geometry other than cylindrical. For example, the frames acquired can be converted to spherical coordinates by using polar and azimuth angles, or longitude and latitude parameters, or another parametrization of a spherical surface. When combined together, the resulting panoramic image has the texture of a surface of a sphere, rather than a surface of a cylinder. Panoramic textures may also correspond to other surface geometries, such as cubical, rhomboidal and elliptical surfaces.

For a second variation, the lens of the camera may be a wide angle lens, a fish-eye lens, a parabolic lens, a hemispherical lens or another type of lens, and the acquired frames may be stored in non-rectilinear coordinates. For example, overlapping frames captured with a hemispherical lens can be readily combined to form a spherical panoramic image. It will be appreciated by persons skilled in the art that the camera of the present invention can be adapted to conform to a variety of coordinate systems, both for the acquired frames and for the panoramic image.

For a third variation, the frames acquired by the camera may be adjacent non-overlapping frames. Such frames can still be combined into a panoramic image.

It will be appreciated by persons skilled in the art that the present invention is not limited by what has been particularly shown and described hereinabove. Rather the present invention includes combinations and sub-combinations of the various features described hereinabove as well as modifications and extensions thereof which would occur to a person skilled in the art and which do not fall within the prior art.

The invention claimed is:

1. A camera, comprising:
   image acquisition circuitry configured to receive images and to acquire a first field of view corresponding to a first orientation of the camera and to acquire a second field of view if the camera is in a second orientation;
   a viewfinder configured to display the second field of view if the camera is in the second orientation and to display at least a portion of the first field of view at least partially composited with the second field of view;
   rectilinear-to-cylindrical conversion circuitry configured to convert the first and second fields of view from rectilinear coordinates to cylindrical coordinates; and
   cylindrical-to-rectilinear conversion circuitry configured to convert a selected portion of a panoramic image from cylindrical coordinates to rectilinear coordinates.

2. The camera of claim 1, wherein the second field of view at least partially overlaps the first field of view.

3. The camera of claim 1, wherein a size of the at least a portion of the first field of view is capable of being prescribed.

4. The camera of claim 3, wherein the size of the at least a portion of the first field of view is capable of being prescribed relative to a size of the first field of view.

5. The camera of claim 3, wherein the size of the at least a portion of the first field of view is capable of being prescribed relative to a size of the second field of view.

6. The camera of claim 5, wherein the size of the at least a portion of the first field of view comprises a width, and the size of the second field of view comprises a width.

7. The camera of claim 5, wherein the size of the at least a portion of the first field of view comprises a height, and the size of the second field of view comprises a height.

8. The camera of claim 5, wherein the size of the at least a portion of the first field of view comprises the field of view angle the size of the at least a portion of the first field of view subtends, and the size of the second field of view comprises the field of view angle the size of the second field of view subtends.

9. The camera of claim 5, wherein the size of the at least a portion of the first field of view is capable of being prescribed to an amount between about 20% and about 40% of the size of the second field of view.

10. The camera of claim 1, wherein the at least a portion of the first field of view is capable of being composited with the second field of view by an opacity of approximately 50%.

11. The camera of claim 1, wherein the at least a portion of the first field of view is capable of being composited with the second field of view by an opacity of approximately 100%.

12. The camera of claim 1, further comprising a camera lens, and
   wherein a focus of the camera lens is configured to not be changed during acquisition of the first and second fields of view.

13. The camera of claim 12, further comprising a lens focus lock capable of locking the focus of the camera lens during acquisition of the first and second fields of view.

14. The camera of claim 1, further comprising combining circuitry configured to combine the first and second fields of view.

15. The camera of claim 14, wherein the first and second fields of view comprise portions of a scene and wherein the combining circuitry is configured to combine the first and second fields of view into the panoramic image.

16. The camera of claim 15, wherein the panoramic image comprises a cylindrical geometry.

17. The camera of claim 15, wherein the panoramic image comprises a spherical geometry.

18. The camera of claim 15, further comprising rectilinear-to-spherical conversion circuitry configured to convert the first and second fields of view from rectilinear coordinates to spherical coordinates.

19. The camera of claim 15, further comprising view control circuitry capable of selecting a portion of the panoramic image to display, and
wherein the viewfinder is configured to display the selected portion of the panoramic image.

20. The camera of claim 15, wherein the panoramic image comprises a spherical geometry, and the camera further comprises spherical-to-rectilinear conversion circuitry configured to convert the selected portion of the panoramic image from spherical coordinates to rectilinear coordinates.

21. The camera of claim 1, further comprising a camera lens,
wherein the acquisition circuitry is capable of acquiring at least one additional field of view with the camera being in at least one additional orientation, and
wherein the viewfinder is capable of displaying an additional field of view of the camera when the camera is in each additional orientation and is configured to display at least a portion of at least one previously acquired field of view at least partially composited with the additional field of view.

22. The camera of claim 21, wherein each additional field of view is configured to at least partially overlap the at least one previously acquired field of view.

23. The camera of claim 21, wherein the at least a portion of the at least one previously acquired field of view is configured to be composited with the additional field of view by an opacity of approximately 50%.

24. The camera of claim 21, wherein the at least a portion of the at least one previously acquired field of view is configured to be composited with the additional field of view by an opacity of approximately 100%.

25. The camera of claim 21, wherein a focus of the camera lens is unchanged during acquisition of the first and second and the at least one additional fields of view.

26. The camera of claim 21, further comprising a lens focus lock configured to lock a focus of the camera lens during acquisition of the first and second and the at least one additional fields of view.

27. The camera of claim 21, further comprising an indicator capable of indicating when the camera is in the second orientation.

28. The camera of claim 27, wherein the indicator comprises a light source.

29. The camera of claim 27, wherein the indicator comprises a beeper.

30. The camera of claim 21, further comprising combining circuitry capable of combining the first and second and the at least one additional fields of view.

31. The camera of claim 30, wherein the first and second and the at least one additional fields of view comprise portions of a scene and wherein the combining circuitry is configured to combine the first and second and the at least one additional fields of view into a panoramic image of the scene.

32. The camera of claim 1, further comprising perspective conversion circuitry configured to convert a perspective of the at least a portion of the first field of view from relative to the first orientation to relative to the second orientation.

33. The camera of claim 32, wherein the perspective conversion circuitry comprises line processing circuitry configured to determine modified color values at pixel locations within vertical lines of the converted at least a portion of the first field of view.

34. The camera of claim 33, wherein the line processing circuitry is configured to determine the modified color values at pixel locations within vertical lines of the converted at least a portion of the first field of view based at least in part on unmodified color values at a corresponding vertical line of the at least a portion of the first field of view.

35. The camera of claim 33, wherein the line processing circuitry is configured to reseal vertical lines of the at least a portion of the first field of view.

36. A method performed by a computing device having a processor and a memory, comprising:
converting by the processor at least a portion of a first image and at least a portion of a second image from a rectilinear-based view to a cylindrical-based view based at least in part on a conversion from rectilinear to cylindrical coordinates;
converting by the processor at least a portion of the cylindrical-based view to a rectilinear-based view based at least in part on a conversion from cylindrical to rectilinear coordinates; and
displaying at least a selected portion of the rectilinear-based view converted from the cylindrical-based view.

37. The method according to claim 36, further comprising compositing the at least a portion of the first and the at least a portion of the second images.

38. The method according to claim 36, further comprising displaying the at least a portion of the first and the at least a portion of the second images.

39. The method according to claim 36, further comprising combining the at least a portion of the first and the at least a portion of the second images into a panoramic image.

40. The method according to claim 39, wherein the panoramic image comprises a cylindrical geometry.

41. The method according to claim 39, wherein the panoramic image comprises a spherical geometry.

42. The method according to claim 39, further comprising converting the at least a portion of first and the at least a portion of the second images from rectilinear coordinates to spherical coordinates.

43. The method according to claim 36, further comprising converting a perspective of a portion of the first image from relative to a first orientation to relative to a second orientation.

44. The method according to claim 43, wherein the perspective converting further comprises line processing which comprises determining modified color values at pixel locations within vertical lines of the portion of the first image.

45. The method according to claim 44, wherein the line processing further comprises determining the modified color values at pixel locations within vertical lines of the portion of the first image based at least in part on unmodified color values at a corresponding vertical line of the portion of the first image.

46. The method according to claim 44, wherein the line processing further comprises rescaling vertical lines of the portion of the first image.

47. A system, comprising:
means for converting at least a portion of a first image and at least a portion of a second image from a rectilinear-based view to a cylindrical-based view based at least in part upon a conversion from rectilinear to cylindrical coordinates;
means for converting at least a portion of the cylindrical-based view to a rectilinear-based view based at least in part on a conversion from cylindrical to rectilinear coordinates; and
means for displaying at least a selected portion of the rectilinear-based view converted from the cylindrical-based view.

48. The system according to claim 47, further comprising means for compositing the at least a portion of the first and the at least a portion of the second images.

49. The system according to claim 47, further comprising means for displaying the at least a portion of the first and the at least a portion of the second images.

50. The system according to claim 47, further comprising means for converting the at least a portion of the first and the at least a portion of the second images from rectilinear coordinates to spherical coordinates.

51. The system according to claim 47, further comprising means for combining the at least a portion of the first and the at least a portion of the second images into a panoramic image.

52. The system according to claim 51, wherein the panoramic image comprises a cylindrical geometry.

53. The system according to claim 47, further comprising means for converting a perspective of a portion of the first image from relative to a first orientation to relative to a second orientation.

54. The system according to claim 53, wherein the means for perspective converting further comprises means for line processing which comprises means for determining modified color values at pixel locations within vertical lines of the portion of the first image.

55. The system according to claim 54, wherein the means for line processing further comprises means for determining the modified color values at pixel locations within vertical lines of the portion of the first image based at least in part on unmodified color values at a corresponding vertical line of the portion of the first image.

56. The system according to claim 54, wherein the means for line processing further comprises means for resealing vertical lines of the portion of the first image.

57. A computer readable storage device having stored thereon instructions that, if executed by a processor, cause the processor to perform at least the following:

converting at least a portion of a first image and at least a portion of a second image from a rectilinear-based view to a cylindrical-based view based at least in part upon a conversion from rectilinear to cylindrical coordinates;

converting at least a portion of the cylindrical-based view to a rectilinear-based view based at least in part on a conversion from cylindrical to rectilinear coordinates; and displaying at least a selected portion of the rectilinear-based view converted from the cylindrical-based view.

58. The article according to claim 57, further comprising compositing the at least a portion of the first and the at least a portion of the second views.

59. The article according to claim 57, further comprising displaying the at least a portion of the first and the at least a portion of the second images.

60. The article according to claim 57, further comprising converting the at least a portion of the first and the at least a portion of the second images from rectilinear coordinates to spherical coordinates.

61. The article according to claim 57, further comprising combining the at least a portion of first and the at least a portion of the second images into a panoramic image.

62. The article according to claim 61, wherein the panoramic image comprises a cylindrical geometry.

63. The article according to claim 57, further comprising converting a perspective of a portion of the first image from relative to a first orientation to relative to a second orientation.

64. The article according to claim 63, wherein the perspective converting further comprises line processing which comprises determining modified color values at pixel locations within vertical lines of the portion of the first image.

65. The article according to claim 64, wherein the line processing further comprises determining modified color values at pixel locations within vertical lines of the portion of the first image based at least in part on unmodified color values at a corresponding vertical line of the portion of the first image.

66. The article according to claim 64, wherein the line processing further comprises rescaling vertical lines of the portion of the first image.

* * * * *

UNITED STATES PATENT AND TRADEMARK OFFICE
CERTIFICATE OF CORRECTION

| | | |
|---|---|---|
| PATENT NO. | : 8,031,223 B2 | Page 1 of 1 |
| APPLICATION NO. | : 11/515498 | |
| DATED | : October 4, 2011 | |
| INVENTOR(S) | : Teo | |

It is certified that error appears in the above-identified patent and that said Letters Patent is hereby corrected as shown below:

Title Page, item (56), under "Other Publications", in Column 2, line 1, delete "4 pp. 1997." and insert -- 4 pp., 1997. --.

Page 2, item (56), under "Other Publications", in Column 2, lines 4-5, delete "2pp. Feb. 10, 1998." and insert -- 2pp., Feb. 10, 1998. --.

Page 2, item (56), under "Other Publications", in Column 2, line 6, delete "Super 35 13.5.96", 1 pg." and insert -- Super 35", May 13, 1996, 1 pg. --.

Column 22, line 47, in Claim 12, delete "configured to not be" and insert -- configured not to be --.

Column 24, line 4, in Claim 35, delete "reseal" and insert -- rescale --.

Column 25, line 30, in Claim 56, delete "resealing" and insert -- rescaling --.

Signed and Sealed this
Seventeenth Day of April, 2012

David J. Kappos
*Director of the United States Patent and Trademark Office*